US006780991B2

(12) United States Patent
Vandersall et al.

(10) Patent No.: US 6,780,991 B2
(45) Date of Patent: Aug. 24, 2004

(54) BIOPOLYMER THICKENED FIRE RETARDANT COMPOSITIONS

(75) Inventors: Howard L. Vandersall, Upland, CA (US); Gary H. Kegeler, Diamond Bar, CA (US)

(73) Assignee: Astaris LLC, St. Louis, MO (US)

( * ) Notice: Subject to any disclaimer, the term of this patent is extended or adjusted under 35 U.S.C. 154(b) by 30 days.

(21) Appl. No.: 09/978,401

(22) Filed: Oct. 16, 2001

(65) Prior Publication Data

US 2002/0100897 A1 Aug. 1, 2002

Related U.S. Application Data

(60) Provisional application No. 60/253,387, filed on Nov. 28, 2000.

(51) Int. Cl.$^7$ .............................. C08L 5/00; C09K 21/04
(52) U.S. Cl. ..................... 536/114; 106/14.12; 106/16; 106/18.11; 106/18.16; 106/18.31; 106/18.32; 252/2; 252/603; 252/610
(58) Field of Search ............................ 106/14.12, 15.05, 106/16, 18.11, 18.14, 18.16, 18.31, 18.32; 252/2, 603, 610; 536/114

(56) References Cited

U.S. PATENT DOCUMENTS

| | | | | | |
|---|---|---|---|---|---|
| 4,822,524 | A | * | 4/1989 | Strickland | .................... 252/603 |
| 4,839,065 | A | | 6/1989 | Vandersall | .................... 252/603 |
| 4,971,728 | A | | 11/1990 | Vandersall | .................... 252/603 |
| 4,983,326 | A | | 1/1991 | Vandersall | .................... 252/603 |
| 5,882,541 | A | * | 3/1999 | Achtmann | .................. 252/8.05 |
| 5,969,011 | A | * | 10/1999 | Frolich et al. | .................. 524/35 |
| 6,323,263 | B1 | * | 11/2001 | Kuwabawa et al. | ........ 523/443 |
| 6,620,348 | B1 | * | 9/2003 | Vandersall et al. | .......... 252/602 |

FOREIGN PATENT DOCUMENTS

EP 911 067 * 4/1999

OTHER PUBLICATIONS

Xantham Gum, Natural Biogum For Scientific Water Control, Fifth Edition, Kelco, Division of Merck & Co., Inc.
H.L. Vandersall, Air Attack: Retardants, Rheology and Some New Options, Int. J. Wildland Fire 4(1): 45–51, 1994, pp. 45–51.
U.S. patent application Ser. No. 10/032,595, Vandersall et al., filed Dec. 26, 2001.
U.S. patent application Ser. No. 09/978,602, Vandersall et al., filed Oct. 16, 2001.
U.S. patent application Ser. No. 09/723,567, Kegeler et al., filed Nov. 28, 2000.
U.S. patent application Ser. No. 10/421,148, Vandersall et al., filed Apr. 23, 2003.
U.S. patent application Ser. No. 10/421,149, Vandersall et al., filed Apr. 23, 2003.

* cited by examiner

Primary Examiner—Peter Szekely
(74) Attorney, Agent, or Firm—Thompson Coburn LLP

(57) ABSTRACT

Fire retardant compositions and methods of making and using the same are provided. The fire retardant compositions are comprised of at least one fire retardant component, including at least one ammonium polyphosphate and at least one biopolymer having a weight average particle diameter of less than about 100 microns. In a specific embodiment, the fire retardant composition is comprised of a xanthan biopolymer.

20 Claims, No Drawings

BIOPOLYMER THICKENED FIRE RETARDANT COMPOSITIONS

CROSS-REFERENCE TO RELATED APPLICATIONS

Priority under the provisions of 35 U.S.C. §119(e) is claimed to U.S. Provisional Application Serial No. 60/253,387, filed Nov. 28, 2000, which is hereby incorporated by reference in its entirety.

STATEMENT REGARDING FEDERALLY SPONSORED RESEARCH OR DEVELOPMENT

Not applicable.

FIELD OF THE INVENTION

The present invention relates to biopolymer-thickened fire retardant compositions. More specifically, the invention is directed to ammonium polyphosphate concentrates and other solutions containing at least one biopolymer for improved Theological advantages.

BACKGROUND

Aerial application of fire-retardant compositions to combat the spread of wildland fires is common. The composition of fire retardants concentrates designed for managing and controlling wildland fires are of two generally types, those which, when mixed or diluted with water to end-use concentration, result in a gum thickened solution, and those which do not contain a gum thickener and, consequently, result in water-like solutions, which are not rheologically modified. These water-like retardant solutions exhibit inferior drop characteristics. The former may be supplied as dry powders, as suspensions, or slurries, which are generally referred to as fluids. Those concentrates that result in water-like solutions when diluted with water may contain suspended components, as well, but are generally referred to as liquid concentrates. Fire retardant concentrates that are supplied as fluids or liquids are preferred by some because they can be simply and easily diluted to end-use strength with little mixing hardware and manpower.

Ammonium polyphosphate liquids have been used as aerially applied fire-retardants. These liquids have certain advantages in comparison to other fire-suppressing compositions since they can be transported and stored prior to use in the liquid form rather than being mixed from dry ingredients. However, concentrated liquid fire retardants and solutions prepared therefrom are extremely corrosive to aluminum and brass and mildly corrosive to other materials of construction used in handling, storage and application equipment. As used herein, all metals include alloys thereof. Accordingly, aluminum includes aluminum 2024T3, 6061 and 7074, steel includes 1010 and 4130 steel, and brass includes yellow and naval brass. Since wildland fire retardants are most frequently transported to the fire and applied aerially, it is imperative that corrosive damage to the materials of construction of fixed-wing aircraft and helicopters be minimized.

Accordingly, the United States Department of Agriculture ("USDA") Forest Service has established, in "Specification 5100-304b (January 2000) Superseding Specification 5100-00304a (February 1986)," entitled "Specification for Long Term Retardant, Wildland Fire, Aircraft or Ground Application" (hereinafter, "Forest Service Specifications"), hereby incorporated by reference in its entirety, maximum allowable corrosion rates for 2024T3 aluminum, 4130 steel, yellow brass and Az-31-B magnesium. For example, the corrosivity of forest fire retardants, in concentrate, to aluminum, steel, yellow brass and magnesium must not exceed 5.0 milli-inches ("mils") per year ("mpy") as determined by the "Uniform Corrosion" test set forth in Section 4.3.5.1 of the aforementioned USDA, Forest Service Specifications. The Forest Service Specifications identify the maximum amount of corrosion acceptable when both the retardant concentrate and its diluted solutions are exposed to each metal indicated above at temperatures of 70° Fahrenheit ("F") and 120° F. in both the totally and partially immersed configuration. The maximum allowable corrosivity of aerially applied fire retardant diluted solutions to aluminum is 2.0 mpy, and the maximum corrosivity to brass and steel is 5.0 mpy when partially immersed and 2.0 when tested in the partially immersed condition. In the partially immersed configurations, one-half of the coupon is within the solution and one-half is exposed to the vapors in the air space over the solution. If the product is applied from fixed-tank equipped helicopters, the corrosivity of the fire retardants to magnesium must not exceed 5.0 mpy.

In an effort to address the corrosivity problems encountered with the use of fertilizer grade ammonium polyphosphates, sodium ferrocyanide was incorporated into the corrosive compositions. Sodium ferrocyanide has proven to be an effective corrosion inhibitor in fire retardant compositions containing ammonium polyphosphate fertilizer solutions. However, while sodium ferrocyanide is effective as a corrosion inhibitor, several disadvantages of its use make its incorporation in wildland fire retardant compositions undesirable. Specifically, the environmental and toxicological safety of ferro(i)cyanides is, at best, questionable. When exposed to acidic conditions and/or ultraviolet radiation from natural sunlight, the ferro(i)cyanide radical readily degrades releasing free iron and cyanide and/or hydrogen cyanide, which are toxic to humans, animals and aquatic life. Further, free iron emanating either from decomposition of a portion of the ferro(i)cyanide radical, or introduced from other components or impurities within the composition, will subsequently react with remaining non-decomposed ferro(i)cyanide to form ferricyanide ("Turnbull's Blue") or ferric ferrocyanide ("Prussian Blue"), which emit a persistent blue-black or indigo-blue coloration, staining all that they contact. Consequently, neither ferricyanide nor ferrocyanide can be used in fire-retardants that are expected to fade and become non-visible over time, for example, in fugitive retardant compositions.

The magnitude of the above concerns is increased since wildland fire retardants are generally applied aerially in a less than completely controlled manner. Due to the presence of variables such as vegetative cover, smoke, or wind drift that impact the trajectory of the free-falling solution, aerially applied wildland fire retardant solutions may land on or near people, animals and in bodies of water, or on soil where it could enter the water supply.

In addition, the rheological properties of wildland fire retardant solutions during periods of extreme and relaxed shear, and its elasticity are recognized as important rheological characteristics. The rheological properties of forest and brush land fire retardant solutions are important because they significantly affect the performance of the retardant during and following aerial discharge and subsequent distribution within the fuel ladder. The degree of dispersion, integrity of the retardant cloud, magnitude of wind-induced drift, as well as the continuity of coverage, retention on and penetration of the fuel complex are among those performance-related characteristics impacted. Fire retardant solutions, which exhibit increased viscosity and elastic properties are more desired because they are less affected by the extreme forces encountered in aerial application, e.g. wind effects, gravity, and shear force due to forward momentum.

Historically, wildland fire retardant solutions, as prepared for application, have been of three general rheological types: (1) unthickened liquid fertilizer solutions with little effective viscosity and elasticity; (2) clay thickened aqueous ammonium sulfate solutions with high apparent viscosity, but little effective viscosity and no elasticity; and (3) high viscosity, pseudoplastic and elastic, gum thickened ammonium phosphate and/or sulfate solutions, which maintain an increased viscosity level and elastic character even when subjected to great amounts of shear.

Guar gums, natural polysaccharides that are extracted from the guar bean, have been used in aerially applied fire retardants to enhance the rheological properties of the retardant solutions. Guar gum thickeners function in an acceptable manner when the ammonium polyphosphate based fire retardant composition is diluted relatively soon after preparation. The rate of degradation of the guar gum thickener varies with the composition of the fertilizer grade ammonium polyphosphate, and can be as short as a few hours. However, when the concentrated retardant is stored for more than about one week, the rate of viscosity decreases to an unacceptable level. For example, experiments have shown that guar gum thickened ammonium polyphosphate fire retardant concentrates stored for one month, or more, prior to dilution shows little tendency to increase in viscosity for several hours and does not reach its expected viscosity level for perhaps a week or more. Since wildland fires occur on a non-predictable basis and a rapid response is required to treat them, this type of behavior is undesirable.

Conventional xanthan biopolymers thickeners having weight average particle diameters in excess of about 100 microns have also been used to alter the rheological characteristics of aerially applied fire retardants. Conventional commercially available xanthan biopolymers include, but are not limited to Kelzan® and Kelzan S® from CP Kelco, Wilmington, Del., and Xanthan AC® from Jungbunzlauer International AG, Basel, Switzerland. However, like guar gums, conventional xanthan biopolymer thickeners perform unacceptably when they are stored in liquid ammonium polyphosphate compositions. Even when prepared freshly, ammonium polyphosphate fire retardant concentrates containing these conventional xanthan biopolymers have a decreased ability to increase the viscosity of the solution in a timely manner upon subsequent dilution with water. As such, the use of conventional xanthan biopolymer thickeners to improve the rheological characteristics of ammonium polyphosphate type fire retardant compositions for aerial application is less desired.

Accordingly, there is a need to provide safe and acceptable wildland fire retardants for the suppression or management of wildland fires that are not corrosive to the equipment associated with the transportation, handling and application of the retardant, have favorable rheological and aerial application characteristics and are environmentally and toxicologically friendly, thereby avoiding the above disadvantages.

SUMMARY OF THE INVENTION

In overcoming the above disadvantages, it is an object of the invention to produce a wildland fire retardant composition that has favorable rheological and aerial application characteristics and is environmentally and toxicologically friendly.

The above and other objects are met by the present invention, which provides a fire retardant composition comprising at least one fire retardant comprised of at least one ammonium polyphosphate and at least one biopolymer having a weight average particle diameter of less than about 100 microns.

In a second aspect, the present invention provides a fire retardant composition comprising at least one fire retardant that includes at least one ammonium polyphosphate and at least one xanthan biopolymer.

In yet a third aspect, the present invention provides a method of suppressing wildland fires that includes aerially applying to wildland vegetation, ahead of wildland fire, a fire suppressing composition that is comprised of water and the above-described corrosion-inhibited fire-retardant compositions of the invention.

In a fourth aspect, the present invention provides a method of preparing the above-described fire retardant compositions of the invention that includes forming an intermediate concentrate composition that includes the above-described fire retardant compositions of the invention and diluting the intermediate concentrate with water to form the fire retardant composition of the invention.

BRIEF DESCRIPTION OF THE DRAWINGS

Not applicable.

DESCRIPTION OF THE INVENTION

In accordance with the present invention, it has been discovered that a fire-retardant composition can be prepared that has a reduced tendency to corrode various metals, including aluminum, that is superior to known fire retardants in rheological aerial application characteristics and both toxicologically and environmentally safe. The corrosion-inhibited fire retardant of the invention includes at least one fire retardant composition comprised of at least one ammonium polyphosphate and a corrosion inhibiting system comprised of at least one corrosion inhibiting compound selected from a group of corrosion inhibiting compounds consisting of azoles, insoluble ferric pyrophosphate (mixtures of insoluble ferric pyrophosphate and sodium citrate), soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferrous fumarate, ferrous oxalate, ferrous oxide, ferric lactate, ferric resinate, and any combination thereof. Generally, the corrosion inhibiting system is present in a minor amount effective to substantially reduce the corrosiveness of the fire retardant composition.

In one embodiment of the invention, a small amount of at least one biopolymer is added to the fire retardant compositions of the invention. When small amounts of biopolymers are added to the fire retardant compositions of the invention, further reduction in aluminum corrosivity is experienced. As shown in Tables 7a and 7b supra, the corrosion-inhibited fire retardant compositions of the invention containing biopolymers pass the corrosion requirements in both concentrate and dilute solutions. Generally, the concentrated fire retardant compositions of the invention comprise in the range of about 0.01% to about 5.0% biopolymer, and preferably at least about 0.5% biopolymer. However, as one skilled in the art will appreciate, compositions comprising biopolymer concentrations outside of this range are also effective. Further, biopolymers having particle diameters outside of the above range may be incorporated into the compositions of the invention without departing from the spirit and scope of the invention. For example, fire retardant compositions containing biopolymers having weight average particle diameters greater than about 100 microns in combination with biopolymers having weight average particle diameters less than about 100 microns would be obvious to one skilled in the art.

In one specific embodiment of the invention, the fire retardant composition, in concentrate, comprises about 1.0% biopolymer. In another specific embodiment of the invention, the fire retardant composition comprises about 3.0% biopolymer, in concentrate. In yet another specific embodiment of the invention, the fire retardant composition comprises about 0.5% biopolymer, in concentrate.

The biopolymer may be any biopolymer having a weight average particle diameter less than about 100 microns. Biopolymers suitable for use in the present invention include, but are not limited to rhamsan, xanthan and welan biopolymers having weight average particle diameters less than about 100 microns. Conventional xanthan thickeners having weight average particle diameters in excess of about 100 microns perform unacceptably when they are stored for more than a few days in contact with liquid ammonium polyphosphate compositions. However, the inventors have found that reducing the particle diameter of biopolymers improves the ability of the biopolymers to rapidly increase the viscosity of the fire retardant composition upon subsequent dilution with water and exhibit increased corrosion inhibition, generally.

For example, a xanthan biopolymer, with a weight average particle diameter in the range of about 100 to about 180 microns performs unacceptably in the fire retardant composition of the present invention, while a chemically identical xanthan gum with an average particle diameter in the range of about 20 to about 70 microns performs acceptably.

In one embodiment, the corrosion-inhibited fire retardant compositions of the invention include at least one xanthan biopolymer having a weight average particle diameter less than about 100 microns. Unlike prior art fire retardant compositions comprising guar gum thickeners, and conventional xanthan biopolymers having a weight average particle diameter greater than about 100 microns, the rate of viscosity of the fire retardant compositions of the invention that are comprised of xanthan biopolymer show viscosity development that is unaffected by the length of time that the biopolymer is in contact with the ammonium polyphosphate fire retardant solution. Some xanthan biopolymers suitable for use in the present invention are found in *Xanthan Gum-natural biogum for scientific water control,* Fifth Edition, herein incorporated by reference in its entirety.

The fire retardant compositions of the invention, specially adapted for aerial application to wildland fires, are prepared by forming an intermediate concentrate composition comprising the above-described fire retardant composition containing the above-described corrosion inhibiting system. The intermediate concentrate is then diluted with water to form the corrosion-inhibited fire retardant composition of the invention. Generally, the fire retardant compositions of the invention, comprise in the range of about 0.00224% to about 1.12% biopolymer in the final mixed composition (after dilution) and preferably, at least 0.112% biopolymer in the final mixed composition. However, as one skilled in the art will appreciate, compositions comprising biopolymer concentrations outside of this range are also effective.

In one specific embodiment, the fire retardant compositions of the invention comprise about 0.112% biopolymer in dilute solution. In another specific embodiment, the fire retardant compositions of the invention comprise 0.224% biopolymer in dilute solution. In yet another specific embodiment, the fire retardant compositions of the invention comprise about 0.672% biopolymer in dilute solution.

In accordance with the present invention, the fire retardant of the invention includes a fire retardant comprised of at least one ammonium polyphosphate. Ammonium polyphosphate is also referred to as polyammonium phosphate and may include ortho-, pyro and polyphosphates, other ammonium phosphates such as metaphosphates, the alkali metal equivalents thereof, as well as a blend of phosphate polymers.

The ammonium polyphosphate solutions that are used as agricultural fertilizer and wildland (vegetative) fire retardants are manufactured by neutralizing aqueous solutions of wet-process phosphoric acid, generally containing about 68% to about 74% phosphorus pentoxide with anhydrous ammonia in such a manner that both high temperature and pressure are experienced. When prepared in this manner, a portion of the impure orthophosphoric acid polymerizes or condenses, resulting in the formation of pyrophosphate, short chain polyphosphates and, in most instances, small amounts of cyclic or metaphosphates. That portion of the acid which does not polymerize, of course, remains as orthophosphoric acid. Ammoniation of this mixture of phosphate species occurs within the reactor, as well, resulting in an aqueous solution containing ammonium ortho, pyro, tripoly, tetrapoly and some higher chain and cyclic phosphate species. These condensed phosphates generally exhibit increased water solubility as compared to orthophosphates and, consequently, more highly concentrated solutions can be prepared when they are present. The relative concentrations of the various species depends primarily on the temperature and pressure achieved within the reactor. Commercial solutions generally contain from about 34% to about 37% phosphorus pentoxide. Phosphorus pentoxide concentrations above about 37% approach water solubility limits resulting in solutions that are not stable, from which solids may precipitate during ambient temperature storage. Solutions of this type are generally referred to as either 10-34-0 or 11-37-0 liquid concentrates; the numerical designation refers to the percentage of their plant nutrient composition, i.e., ammoniacal nitrogen, phosphorus pentoxide and potassium oxide.

It should be noted that the condensed phosphates that are present in liquid concentrate solutions are subject to hydrolyses which results in de-polymerization. The rate of hydrolytic degradation increases with time, temperature, and the relative acidity of the solution. Therefore, ammonium polyphosphate concentrates and their solutions may vary in species composition as received and as time progresses during their subsequent storage.

These liquid concentrates may additionally contain small amounts of diammonium sulfate and a host of metal and alkali-metal impurities. The quantity and quality of these impurities vary with the composition of the phosphate ore, the utilized process and the extent of purification that is conducted during manufacture of the wet-process phosphoric acid. Since these solutions are manufactured primarily as nutrients, the quality control parameters of greatest interest are the percentages of their contained nutrients—nitrogen and phosphorus—and the clarity, stability and color of the solution rather than purity per se.

The corrosion inhibiting system of the invention is comprised of at least one corrosion inhibiting compound selected from a group of corrosion inhibiting compounds consisting of azoles, insoluble ferric pyrophosphate, soluble ferric pyrophosphate, ferrous oxalate, ferric citrate, ferrous sulfate, ferric ammonium citrate, insoluble ferric orthophosphate, soluble ferric orthophosphate, ferric ammonium oxalate, ferric ammonium sulfate, ferric bromide, ferric sodium oxalate, ferric stearate, ferric sulfate, ferrous acetate, ferrous ammonium sulfate, ferrous bromide, ferrous gluconate, ferrous iodide, ferric acetate, ferric fluoroborate, ferric hydroxide, ferric oleate, ferrous fumarate, ferrous oxalate, ferrous oxide, ferric lactate, ferric resinate and any combination thereof. In one preferred embodiment, the corrosion inhibiting system is comprised of at least one soluble corrosion inhibiting compound and at least one insoluble corrosion inhibiting compound. The combination of such soluble and insoluble corrosion inhibiting iron containing compounds appears to provide the optimum combination of corrosion inhibition.

A minor amount of the corrosion inhibiting system of the invention effective to substantially reduce the corrosiveness of the fire retardant composition is included in the corrosion-inhibited fire retardant composition of the invention. A minor effective amount of the corrosion inhibiting system is that amount that substantially reduces the corrosivity of the fire retardant. As is understood by one of ordinary skill in the art, what constitutes a substantial reduction in corrosivity is largely dependent on the specific fire retardant used in the fire retardant composition of the invention, as well as the specific composition of the corrosion inhibiting system and can be readily determined without undue experimentation.

In one embodiment, the corrosion inhibiting system of the invention is present in a minor amount effective in the corrosion-inhibited fire retardant composition, in concentrate, to obtain at least one with a maximum corrosivity to aluminum of 5.0 mpy, yellow brass of 5.0 mpy, and steel of 5.0 mpy, as determined by the "Uniform Corrosion Test" set forth in Section 4.5.6.1.2 of "Specification 5100-304b (January 2000) Superseding Specification 5100-304a (February 1986)," entitled "Specification For Long Term Retardant, Wildland Fire, Aircraft or Ground Application," issued by the USDA, and herein incorporated by reference in its entirety.

In a specific embodiment, the corrosion inhibiting system of the invention comprises in the range of about 0.01% to about 10.0% of the total corrosion-inhibited fire retardant. In another specific embodiment, the corrosion inhibiting system of the invention comprises in the range of about 0.3% to about 6.0% of the total corrosion-inhibited fire retardant. In yet another specific embodiment, the corrosion inhibiting system of the invention comprises in the range of about 0.6% to about 5.0% of the total corrosion-inhibited fire retardant.

Prior to use, and in one embodiment of the invention, the corrosion-inhibited compositions of the invention are blended with water to form dilute solutions containing the amount of phosphorus pentoxide required to achieve the maximum amount of vegetation coverage at an application rate sufficient to reduce the flammability of the vegetative fuels to the desired level. The water used in the composition of the invention may be tap water or water from other convenient water sources. Generally, the compositions are diluted one part concentrate to in the range of about three to seven parts water. In a specific embodiment, the compositions of the invention are diluted one part concentrate to in the range of about four to six parts water. However, it should be noted that the compositions of the invention may be diluted outside of the above ranges, for example where improved retardant penetration is desired.

In a specific embodiment, the compositions of the invention are blended with water to form dilute solutions containing the amount of phosphorus pentoxide required to meet USDA, Forest Service Specification fire-retardant effectiveness requirements. This concentration, which is determined via combustion-retarding effectiveness testing described in USDA, Forest Service Specification 5100-304b, "4.5.2. Combustion Retarding Effectiveness Test," will generally depend on the percentage of phosphorus pentoxide present in the concentrated composition and the extent of its availability for retarding reactions. The corrosion-inhibited fire retardant composition of the invention is typically diluted to an amount effective to achieve maximum coverage of vegetation at an application rate sufficient to reduce the flammable fuels to a desired level. The minimum USDA, Forest Service Specifications, for combustion retarding effectiveness, as specified in Specification 5100-304b, is generally obtained when the corrosion-inhibited fire retardant concentrate of the invention is diluted with about 1 to about 8 volumes of water.

To suppress wildland fires, the corrosion-inhibited fire retardant compositions of the invention are diluted with water and applied on threatened vegetation, ahead of approaching wildland fire. Ammonia from both the ammonium phosphate and the ammonium sulfate are liberated at temperatures below the ignition temperature of the fuel. As used herein ammonium sulfates include ammonium thiosulfate. Accordingly, sulfuric acids include thiosulfuric acid. The phosphoric and sulfuric acids are both initially effective fire retarding acids. The phosphoric acid will remain present and effective with the vegetative fuel until temperatures exceed 600° C. However, the boiling point of sulfuric acid is much lower and the amount present will decrease as fuel temperature increases. Thus, at least a portion of the sulfuric acid is lost prior to the ignition temperature of the fuel. The resultant mineral acids subsequently react with the cellulosic components of vegetative fuels on which they are applied. Their thermal decomposition is thereby altered in such a manner that they will no longer serve as fuel. These reactions are described in U.S. Pat. No. 4,839,065 to Vandersall, which is hereby incorporated by reference in its entirety.

The fire retardant compositions of the invention may also contain suspending agents. Suspending agents effectively reduce the rate of separation and settling during long term storage. Thus, as one skilled in the art would appreciate, the amount of suspending agent depends upon its relative effectiveness per unit applied, the desired length of storage, and the additional additives incorporated into the compositions of the invention. As used herein, suspending agents useful in the compositions of the invention include colloidal clays, for example, Attapulgus, Fuller's earth, Sepiolite, Montmorillonite, and Kaolin clays. As used herein, Attapulgus clay includes, but is not limited to attapulgite and polygorskite. As used herein, Kaolin clay includes, but is not limited to Kaolinite, $[Al_2Si_2O_7\text{-}2(H_2O)]$ and $[Al_2O_3\text{-}2SiO_2\text{-}2(H_2O)]$.

As will be apparent to those skilled in the art, the corrosion-inhibited fire retardant of the invention may contain or be mixed with other functional components or additives such as suspending agents, coloring agents, surfactants, stabilizers, opacifying agents, other corrosion inhibitors, any combination thereof, or, with other functional components.

For example, and in one embodiment of the invention, the corrosion-inhibited fire retardant compositions of the invention include at least one highly colored pigment. The colored pigment is incorporated to assist in the visual identification of treated and untreated vegetation. Suitable highly colored pigments include iron oxide, which produces many colors like brown and red, titanium dioxide pigments, which produce a white color, or an ultra-violet sensitive dye dispersed in biodegradable plastic. However, for certain uses, like along roadsides or in parks, it may be desirable to exclude any colorant from the mixture. Accordingly, as one skilled in the art would appreciate, the amount of colorant or pigment incorporated into the compositions of the invention depends on the degree of the dilution and visibility contemplated by the user. Visibility is usually obtained with red iron oxide when it is present in the diluted solution in the range of about 0.15% to about 0.4%, depending on the colorant characteristics and on the vegetative and topographical characteristics of that on which it will be applied. The amount that must be incorporated in the concentrate will, of course, vary with the dilution rate required to provide adequate fire retarding effectiveness.

In another embodiment, the present invention includes at least one of red iron oxide or brown iron oxide, or a combination thereof. In yet another embodiment, the present invention includes a fugitive coloring agent, whose color fades upon exposure to the elements. In a further embodiment, the present invention includes opacifying pigments, which are generally not highly colored, but have the ability to cover and hide that on which they are deposited so that a highly colored pigment becomes more visible.

Surfactants may also be added to increase visibility, through the generation of a foam, and to improve penetration of the retardant solution into porous fuels. Accordingly, as one skilled in the art would appreciate, the amount and type of surfactant incorporated into the compositions of the invention depends on the degree of the dilution and visibility contemplated by the user.

It has been discovered that azoles are effective corrosion inhibitors for brass. Accordingly, and in one embodiment of the invention, the compositions of the invention comprise at least one azole. As used herein, an azole is any of a group of chemical compounds with a five-membered ring containing one or more nitrogen atoms. Azoles suitable for use in the corrosion-inhibited fire retardants of the invention include, but are not limited to tolytriazole, benzotriazole, mercaptobenzothiazole, dimercaptothiadiazole, 1,2 benzisothiazoline-3-1,2-benzimidazolone, 4,5,6,7-tetrahydrobenzotriazole, tolylimidazole, 2-(5-ethyl-2-pyridyl) benzimidazole, phthalimide, any alkali metal salts thereof and combinations thereof. The amount of azole or other corrosion inhibitor is dependent upon the corrodible metal for which corrosion resistance is desired, the level of resistance desired, and the specific concentration of the fire retardant composition employed, including corrosion inhibiting compounds contained therein.

However, in one specific embodiment of the invention, the corrosion-inhibited fire retardant concentrates of the invention include at least one azole, present in a minor amount effective to obtain a corrosivity of yellow brass to a maximum of 5.0 mpy, as determined by the "Uniform Corrosion Test" set forth in Section 4.5.6.1 of "Specification 5100-304b (January 2000) Superseding Specification 5100-304a (February 1986)," entitled "Specification For Long Term Retardant, Wildland Fire, Aircraft or Ground Application," issued by the USDA. In another specific embodiment of the invention, the fire retardant concentrate of the invention comprises in the range of about 0.01% to about 1.0% tolytriazole. In yet another specific embodiment, the composition of the invention includes in the range of about 0.2% to about 0.6% tolytriazole. In yet another specific embodiment, the composition of the invention includes in the range of about 0.3% to about 0.5% tolytriazole.

A method of inhibiting corrosion using the above-described corrosion inhibiting system of the invention is also provided. According to the method of the invention, a corrodible material is provided and contacted with an effective amount of the corrosion inhibiting system of the invention to substantially reduce the corrosiveness of the fire retardant.

In one embodiment, the corrodible material is selected from a group of corrodible materials consisting of steel, brass, aluminum and any alloy thereof.

Prior to use, and in one embodiment of the invention, the corrosion inhibited fire retardant composition of the invention and biopolymer, if present, are blended with water prior to or during contact with the corrodible material. The water used in the composition of the invention may be tap water or water from other convenient water sources.

In one embodiment, the corrosion inhibiting system includes at least one additive selected from a group of additives including suspending agents, coloring agents, surfactants, opacifying pigments, stabilizers, corrosion inhibitors and any combination thereof.

While the corrosion-inhibited fire retardant compositions of the invention reduce aluminum corrosivity in the absence of biopolymers, biopolymers do not significantly reduce the corrosion of aluminum in the absence of the corrosion inhibiting system of the invention. However, it has been discovered that the fire retardant compositions of the invention that include at least one biopolymer, as described above, improve the rheological characteristics of the retardants of the invention in the absence of the corrosion-inhibiting system. Specifically, increased viscosity is shown in dilute solutions comprising the above-described corrosion-inhibited fire retardant composition containing biopolymer, in the absence of the corrosion inhibiting system of the invention. Accordingly, and in one embodiment, the fire retardant compositions of the invention comprise at least one above-described fire retardant composition comprised of at least one ammonium polyphosphate, and at least one above-described biopolymer having a weight average particle diameter less than about 100 microns. This embodiment, which does not include the above-described corrosion inhibiting system of the invention, will herein after be referred to as the viscosity-increased fire retardant compositions of the invention.

While suspending agents may be utilized in the fire retardant compositions of the invention, the use of suspending agents is not necessary for the improved rheological and/or anti-corrosive characteristics of the compositions of the invention to be realized.

The viscosity-increased fire retardant compositions of the invention generally comprise in the range of about 0.01% to about 5.0% biopolymer, in concentrate composition and preferably, at least about 0.5% biopolymer. However, as one skilled in the art will appreciate, compositions comprising biopolymer concentrations outside of this range are also effective in increasing the viscosity of fire retardant compositions.

In one specific embodiment of the invention, the viscosity-increased fire retardant compositions of the invention, in concentrate, comprise about 1.0% biopolymer. In another specific embodiment of the invention, the fire retardant compositions, in concentrate, comprise about 3.0% biopolymer. In yet another specific embodiment, the fire retardant compositions of the invention, in concentrate, comprise about 0.5% biopolymer.

In one specific embodiment, the viscosity-increased fire retardant compositions of the invention include at least one above-described xanthan biopolymer. In another specific embodiment, the viscosity-increased fire retardant compositions of the invention include at least one fire retardant composition comprised of at least one ammonium polyphosphate, in the range of about 0.01% to about 5.0% at least one xanthan biopolymer having a weight average particle diameter less than about 100 microns, in concentrate, in the range of about 0.00224% to about 1.12% biopolymer in diluted solution, and at least one above-described additive or functional component.

Thickeners, for example, hydroxypropyl guar, may optionally be incorporated into the above-described fire retardant compositions of the invention. The existence of such thickeners in the compositions of the invention is not necessary for anti-corrosive or improved rheological characteristics to be realized. If employed, the quantity of other gums in the compositions of the invention will vary depending in part on the nature and concentration of the fire-retardant salts present, the presence of impurities, and the presence of other components. Accordingly, in one embodiment of the invention, the compositions of the invention do not contain thickeners, for example, hydroxypropyl guar. In an alternate embodiment of the invention, the compositions of the invention contain thickeners, for example, hydroxypropyl guar, or non-ether derivative guars.

The viscosity-increased fire retardant compositions of the invention are prepared in the same manner as the above-described corrosion-inhibited fire retardant compositions of the invention. Accordingly, and in one embodiment, the viscosity-increased fire retardant compositions of the invention are prepared by forming an intermediate concentrate composition comprising the above-described fire retardant compositions of the invention and diluting the intermediate concentrate with water to form the increased-viscosity fire retardant composition of the invention. The viscosity-increased fire retardant compositions of the invention are diluted in the same manner described above with reference to the corrosion-inhibited compositions of the invention.

In a specific embodiment, the increased-viscosity fire retardant compositions of the invention are prepared by forming an intermediate concentrate composition comprised of at least one above-described increased-viscosity fire retardant composition and at least one xanthan biopolymer having a weight average particle diameter less than about 100 microns, wherein the fire retardant compositions comprise in the range of about 0.01% to about 5.0% xanthan biopolymer, and diluting the intermediate concentrate with water to form the increased-viscosity fire retardant composition of the invention.

Methods of suppressing wildland fires using the viscosity-increased fire retardant compositions of the invention are also provided in accordance with the invention. In one embodiment, the method includes the step of aerially applying to wildland vegetation a fire suppressing composition comprising water and at least one retardant composition of the invention. In a specific embodiment, the method includes aerially applying to wildland vegetation a fire suppressing composition comprising water, at least one ammonium polyphosphate composition, in the range of about 0.00224% to 1.12% at least one xanthan biopolymer having a weight average particle diameter less than about 100 microns and at least one above-described additive. In another specific embodiment, the method includes aerially applying to wildland vegetation a fire suppressing composition comprising water, at least one ammonium polyphosphate solution, in the range of about 0.00224 to about 1.12% at least one xanthan biopolymer and the above-described corrosion inhibiting system of the invention.

All references and patents cited herein are hereby incorporated by reference in their entireties for their relevant teachings. Accordingly, any reference cited herein and not specifically incorporated by reference is, nevertheless, incorporated by reference in its entirety as if part of the present specification.

The following examples illustrate specific embodiments of the invention without limiting the scope of the invention in any way. In each example employing ammnonium polyphosphate, samples of ammonium polyphosphate fire retardant concentrates were mechanically admixed with iron containing compounds, biopolymers, additives, and in some cases, with an azole, as indicated in each table. Any mechanical mixing technique that is well known in the art may be used in the present invention. The concentrated fire retardant solutions are diluted with water, as indicated. The "Requirements" row illustrates the level of aluminum 2024-T3 corrosion allowed by the USDA, Forest Service Specifications 5100-304b, i.e., the maximum allowable corrosivity for product acceptance for use in wildland fire retardant compositions. The resulting samples were tested for corrosivity in accordance with USDA, Forest Service Specifications 5100-304b.

EXAMPLE 1

The Aluminum Corrosivity of Neat Ammonium Polyphosphate Solution

Table 1 illustrates the corrosion characteristics of neat, unadulterated fertilizer grade 10-34-0 and 11-37-0 ammonium polyphosphate liquid concentrates obtained from three different sources. All of the samples are either 10-34-0 or 11-37-0, as received, with no additions. The corrosivity of the samples were expressed in milli-inches per year ("mpy") of metal loss on exposed metal surface based on the conventional USDA, Forest Service Specifications for determining corrosivity. Both the concentrated retardant and its diluted solutions were tested at each temperature and condition indicated.

The diluted solutions were prepared by admixing four to five volumes of water with one volume of the concentrated solution. Thus, the diluted solutions were in the range of between about 15% to about 20% by volume of the concentrate.

In accordance with the Forest Service Specifications for corrosion testing of fire retardants, a one-inch wide, four-inch long, one-eighth inch thick coupon of the aluminum was obtained from a standard source. The coupon is cleaned, dried and weighed according to standard USDA, Forest Service Specification Protocols and suspended in a one quart, straight sided jar filled either 50% (partially) or 100% (totally) using a piece of nylon string. When suspended in a partially full jar, the coupon was 50% (two-inches) immersed in the test solution with the other 50% extending up from the solution into the air space above it. When the jar was full with approximately 800 ml of the solution, the metal coupon was totally immersed in the solution. The jars were then closed with a screw cap and two or three identical corrosion jars (cells) of each partially and totally immersed coupons were stored at 70° F. and 120° F. for ninety days. At the end of the ninety day storage period, the jars were opened and the coupons were removed and cleaned according to the USDA, Forest Service Specifications. After coupon dried it was re-weighed and its weight loss was determined by comparing its initial and final weights. The calculated weight loss and density of the metal coupon were used to extrapolate to mils (0.001 inches) of aluminum that would be lost during a one-year period at the test condition, assuming that the weight loss was experienced uniformly across the coupon surface. The corrosion rate of both the partially and totally immersed coupons were calculated using the total surface area of the coupon. The samples at each condition were then averaged and reported as the corrosion rate. The results are shown in Table 1.

TABLE 1

| | Aluminum Corrosivity when tested in the indicated configuration (mpy) | | | | | | | |
|---|---|---|---|---|---|---|---|---|
| | Neat Concentrate | | | | Diluted Solution | | | |
| Ammonium Polyphosphate Samples | 70° F. total | 70° F. partial | 120° F. total | 120° F. partial | 70° F. total | 70° F. partial | 120° total | 120° partial |
| Requirements | ≦5.0 | ≦5.0 | ≦5.0 | ≦5.0 | ≦2.0 | ≦2.0 | ≦2.0 | ≦2.0 |
| Sample 1 | 8.7 | 4.3 | 134.3 | 77.8 | 8.4 | 6.5 | 24.9 | 5.7 |
| Sample 2 | 12.4 | 6.6 | 106.6 | 78.5 | 15.2 | 8.4 | 10.1 | 5.6 |
| Sample 3 | | | 146.0 | | | | 5.8 | |
| Sample 4 | 8.1 | 4.1 | 140.7 | 67.4 | 5.8 | 6.3 | 11.4 | 7.8 |
| Sample 5 | | | 129.4 | | | | 11.0 | |
| Sample 6 | | | 170.0 | | | | 10.8 | |
| Sample 7 | | | 168.5 | | | | 7.4 | |
| Sample 8 | 10.2 | 5.3 | 165.0 | 88.6 | 12.3 | 6.4 | 21.8 | 13.3 |
| Sample 9 | 10.9 | 5.5 | 161.4 | 85.3 | 12.0 | 7.0 | 39.0 | 14.8 |
| Sample 10 | | | 130.0 | | | | 21.1 | |
| Sample 11 | | | 126.2 | | | | 22.8 | |
| Sample 12 | 4.3 | | 109.4 | | 11.0 | | 6.4 | |
| Sample 13 | | | 149.4 | | | | 33.7 | |
| Sample 14 | 9.5 | | 155.6 | | 12.7 | | 35.8 | |
| Sample 15 | 12.7 | 6.0 | 201.0 | 96.5 | 12.8 | 7.5 | 35.8 | 19.3 |
| Sample 16 | 13.1 | 7.1 | 159.0 | 86.7 | 11.2 | 6.5 | 42.7 | 21.8 |
| Sample 17 | | | 151.5 | | | | 13.3 | |
| Sample 18 | | | 136.3 | | | | 29.2 | |
| Sample 19 | 12.0 | 6.3 | 144.8 | 94.5 | 17.7 | 10.4 | 10.5 | 7.0 |
| Sample 20 | 9.9 | | 115.8 | | 13.8 | | 12.4 | |
| Sample 21 | 15.2 | | 176.9 | | 12.7 | | 35.1 | |
| Sample 22 | 10.9 | 5.5 | 172.6 | 74.8 | 13.1 | 7.2 | 42.9 | 18.3 |
| Average | 10.6 | 5.6 | 147.7 | 83.3 | 12.2 | 7.4 | 22.0 | 12.6 |
| Range (Lo–Hi) | 4.3–15.2 | 4.1–7.1 | 106.6–201.0 | 67.4–94.5 | 5.8–17.7 | 6.3–10.4 | 5.8–42.9 | 5.6–21.8 |

The corrosivity of the ammonium polyphosphate solutions to aluminum 2024T-3 was relatively low when the temperature was maintained at about 70° F. However, none of the samples of the neat ammonium polyphosphate solutions met the Forest Service Specifications for corrosivity of fire retardants. In addition, the results show that increasing the solution temperature to 120° F. dramatically increases the corrosion of the aluminum coupon by the neat ammonium polyphosphate samples, i.e., in excess of an order of magnitude.

EXAMPLE 2

The Aluminum Corrosivity of Ammonium Polyphosphate Solution Containing Iron Oxide & Attapulgus Clay The corrosion characteristics of neat fertilizer grade ammonium polyphosphate solutions containing additional amounts (<3%) of a mixture of an iron oxide colorant and Attapulgus clay is illustrated in Table 2. Each sample was prepared by admixing neat concentrated ammonium polyphosphate obtained from several sources with Attapulgus clay, and either 1.2% red iron oxide or 1.2% brown iron oxide, as indicated. In addition, 0.3% tolytriazole was also admixed into samples 11, 15, 16, 18 and 19 and 0.5% tolytriazole was admixed into sample 20. Aliquots from these concentrate samples were then diluted by admixing 1.0 volume of concentrate with 4.25 volumes of tap water. The concentrates and their solutions were then tested for corrosivity and diluted in accordance with Forest Service Specifications. The results are shown in Table 2.

T3 corrosion rate of the concentrates or its solutions to within the limits required by the USDA, Forest Service Specifications.

EXAMPLE 3

The Aluminum Corrosivity of Ammonium Polyphosphate Solutions Containing a Mixture of Soluble and Insoluble Iron Compounds The data in Tables 3a and 3b illustrate the relative effectiveness of a number of corrosion inhibitor systems containing water soluble and water insoluble sources of iron, and mixtures thereof, in several sources and types of ammo-

TABLE 2

| | | Corrosion Rate (milli-inches per year) | | | | | | | |
|---|---|---|---|---|---|---|---|---|---|
| | | Neat Concentrate | | | | Diluted Solution | | | |
| Ammonium Polyphosphate Samples | Type of Iron Oxide | 70° F. total | 70° F. partial | 120° F. total | 120° F. partial | 70° F. total | 70° F. partial | 120° F. total | 120° F. partial |
| Corrosion of neat 10-34-0 Average from Table 1 | none | 10.6 | 5.6 | 147.7 | 83.3 | 12.2 | 7.4 | 22.0 | 12.6 |
| Requirements | | ≦5.0 | ≦5.0 | ≦5.0 | ≦5.0 | ≦2.0 | ≦2.0 | ≦2.0 | ≦2.0 |
| Sample 1 | Bn Iron oxide[1] | | | 1.4 | | | | 4.4 | |
| Sample 2 | Bn Iron oxide[1] | | | 0.7 | | | | 3.7 | |
| Sample 3 | Bn Iron oxide[1] | | | 1.4 | | | | 2.3 | |
| Sample 4 | Bn Iron oxide[1] | | | 6.4 | | | | 10.1 | |
| Sample 5 | Rd Iron oxide[2] | 4.6 | 3.6 | 7.3 | 5.0 | 6.7 | 4.4 | 4.0 | 3.6 |
| Sample 6 | Rd Iron oxide[2] | 3.5 | 1.9 | 6.7 | 9.0 | 4.3 | 3.9 | 2.5 | 3.3 |
| Sample 7 | Rd Iron oxide[2] | | | 2.3 | | | | 4.5 | |
| Sample 8 | Rd Iron oxide[2] | 3.5 | 3.8 | 1.7 | 1.6 | 2.8 | 4.3 | 3.5 | 3.6 |
| Sample 9 | Rd Iron oxide[2] | | | 3.0 | | | | 3.1 | |
| Sample 10 | Rd Iron oxide[2] | | | 15.3 | | | | 11.7 | |
| Sample 11 | Rd Iron oxide[2] | | | 32.1 | | | | 7.1 | |
| Sample 12 | Rd Iron oxide[2] | | | 8.3 | | | | 3.8 | |
| Sample 13 | Rd Iron oxide[2] | | | 26.3 | | | | 3.9 | |
| Sample 14 | Rd Iron oxide[2] | | | 19.7 | | | | 3.8 | |
| Sample 15 | Rd Iron oxide[2] | | | 4.3 | | | | 0.8 | |
| Sample 16 | Rd Iron oxide[2] | | | 6.7 | | | | 5.3 | |
| Sample 17 | Rd Iron oxide[2] | | | 2.3 | | | | 4.2 | |
| Sample 18 | Rd Iron oxide[2] | 1.4 | | 8.0 | | 2.7 | | 2.0 | |
| Sample 19 | Rd Iron oxide[2] | 5.0 | 3.5 | 8.5 | 13.7 | 5.7 | 4.2 | 5.4 | 4.1 |
| Sample 20 | Rd Iron oxide[2] | 4.4 | 2.4 | 11.2 | 2.8 | 4.1 | 4.0 | 2.3 | 2.8 |
| Sample 21 | Rd Iron oxide[2] | | | 2.0 | | | | 1.9 | |
| Sample 22 | Rd Iron oxide[2] | | | 7.8 | | | | 11.1 | |
| Average | | 3.7 | 3.0 | 8.3 | 6.4 | 4.4 | 4.2 | 4.6 | 3.5 |
| Range | | 1.4–5.0 | 1.9–3.8 | 0.7–32.1 | 1.6–13.7 | 2.7–5.7 | 3.9–4.3 | 2.5–11.7 | 2.8–4.1 |

[1]Brown iron oxide, Lot number 5594050A. Elementis Pigments No. 8690.
[2]Red iron oxide, Lot number 5891719A, Elementis Pigments R03097 precipitated Kroma red pigment The results indicate that the addition of small amounts of iron oxide and clay reduce the corrosion of totally immersed aluminum in a 70° F. solution by 50% to 65%. In addition, the impact of the mixture on high temperature corrosion is even more dramatic than at low temperatures. When the corrosion cell was stored at 120° F., the rate of aluminum corrosion decreased by about 75% to 90%. At both temperatures the corrosion rate on partially immersed coupons was greater than 50% of the totally immersed values, which indicated that significant interface or vapor/air phase corrosion occurs when the mixture is present in the solution. This differs from the corrosivity of the neat ammonium polyphosphate solutions of Table 1. However, the addition of 1.2% insoluble iron oxide and a clay to the ammonium polyphosphate samples did not reduce the aluminum 2024- nium polyphosphate concentrates and their diluted solutions. The samples were prepared by admixing either 10-34-0 or 11-37-0 type ammonium polyphosphate solutions from various sources with varying concentrations of insoluble red iron oxide or brown iron oxide additives and Attapulgus clay additives and varying the concentrations of other iron containing additives, as indicated. Samples 1, 2, 3 and 4 are 10-34-0 ammonium polyphosphate concentrates from different sources. The solutions were subjected to high shear mixing in order to activate or hydrate the clay.

Each concentrate and its diluted solution was tested for aluminum corrosivity in accordance with the Forest Service Specification protocols. The results are shown in Tables 3a and 3b.

TABLE 3a

Corrosion (mpy)

| Ammonium Polyphosphate Sample | Insoluble Iron Oxide Added % | Type | Other Iron Containing Additive (%) | Additive | Fe. Content % insol. | % sol | Neat Concentrate 70° F. Total | 70° F. partial | 120° F. total | 120° F. Partial | Diluted Solution 70° F. total | 70° F. patial | 120° F. total | 120° F. partial |
|---|---|---|---|---|---|---|---|---|---|---|---|---|---|---|
| 1 | SAMPLE 1 (See Table 1) | 0.0 None | 0.0 | None | 0.00 | 0.00 | 9.1 | 5.2 | 140.6 | 79.5 | 10.8 | 6.9 | 1.6 | 9.4 |
| 2 | | 1.2 Iron oxide | 0.0 | None | 0.00 | 0.00 | 3.7 | 3 | 8.3 | 6.4 | 4.4 | 4.2 | 4.6 | 3.5 |
| 3 | | 0.6 Br. Iron oxide | 3.0 | Sol. Ferric pyrophosphate | 0.42 | 0.35 | | | 7.4 | | | | 0.5 | |
| 4 | | 0.6 Br. Iron oxide | 5.0 | Sol. Ferric pyrophosphate | 0.42 | 0.58 | | | 9.0 | | | | 0.6 | |
| 5 | | 1.2 Br. Iron oxide | 3.0 | Sol. Ferric pyrophosphate | 0.84 | 0.35 | | | 2.2 | | | | 1.0 | |
| 6 | | 1.2 Br. Iron oxide | 3.0 | Sol. Ferric pyrophosphate | 0.84 | 0.35 | | | 2.2 | | | | 1.0 | |
| 7 | | 1.2 Red Iron oxide | 3.0 | Sol. Ferric pyrophosphate | 0.84 | 0.35 | | | 5.7 | | | | 1.3 | |
| 8 | | 1.2 Red Iron oxide | 3.0 | Sol. Ferric pyrophosphate | 0.84 | 0.35 | | | 10.9 | | | | 2.5 | |
| 9 | | 1.2 Red Iron oxide | 3.0 | Sol. Ferric pyrophosphate | 0.84 | 0.35 | | | 10.8 | | | | 1.6 | |
| 10 | | 1.2 Red Iron oxide | 3.0 | Sol. Ferric pyrophosphate | 0.84 | 0.35 | | | 10.3 | | | | 1.5 | |
| 11 | | 1.2 Red Iron oxide | 3.0 | Sol. Ferric pyrophosphate* | 0.84 | 0.35 | | | 18.1 | | | | 1.6 | |
| 12 | | 1.2 Red Iron oxide | 3.0 | Sol. Ferric pyrophosphate* | 0.84 | 0.35 | 3.1 | 3.1 | 6.1 | 2.9 | 4.4 | 3.6 | 1.6 | 3.4 |
| 13 | | 0.6 Br. Iron oxide | 0.6 | Sol. Ferric citrate* | 0.42 | 0.13 | | | 118.7 | | | | 1.4 | |
| 14 | | 0.6 Br. Iron oxide | 3.0 | Sol. Ferric citrate | 0.42 | 0.66 | | | 5.5 | | | | 0.6 | |
| 15 | | 0.6 Br. Iron oxide | 3.0 | Sol. Ferric citrate* | 0.42 | 0.66 | | | 6.7 | | | | 0.6 | |
| 16 | | 1.2 Br. Iron oxide | 1.8 | Sol. Ferric citrate* | 0.84 | 0.40 | | | 0.9 | | | | 0.5 | |
| 17 | | 1.2 Br. Iron oxide | 1.8 | Sol. Ferric citrate* | 0.84 | 0.40 | | | 15.3 | | | | 3.3 | |
| 18 | | 1.2 Red Iron oxide | 1.8 | Sol. Ferric citrate* | 0.84 | 0.40 | | | 46.5 | | | | 2.2 | |
| 19 | | 1.2 Br. Iron oxide | 3.0 | Sol. Ferric citrate* | 0.84 | 0.66 | | | 1.0 | | | | 0.7 | |
| 20 | | 1.2 Br. Iron oxide | 3.0 | Sol. Ferric citrate | 0.84 | 0.66 | | | 4.5 | | | | 0.7 | |
| 21 | | 1.2 Br. Iron oxide | 3.0 | Sol. Ferric citrate | 0.84 | 0.66 | | | 3.9 | | | | 0.6 | |
| 22 | | 1.2 Br. Iron oxide | 3.0 | Sol. Ferric citrate | 0.84 | 0.66 | | | 1.0 | | | | 0.7 | |
| 23 | | 0.6 Br. Iron oxide | 5.0 | Sol. Ferric NH4 citrate | 0.42 | 0.88 | | | 7.9 | | | | 0.8 | |
| 24 | | 1.2 Red Iron oxide | 1.8 | Sol. Ferric NH4 citrate | 0.84 | 0.32 | | | 53.9 | | | | 3.4 | |
| 25 | | 1.2 Red Iron oxide | 3.0 | Sol. Ferrous sulfate*7H20 | 0.84 | 0.60 | | | 1.0 | | | | 3.4 | |
| 26 | | 1.2 Red Iron oxide | 1.2/3.0 | Insol./sol. Ferric pyrophosphate | 1.13 | 0.35 | | | 7.5 | | | | 1.3 | |
| 27 | | | 1.2/3.0 | Insol./sol. Ferric pyrophosphate | 0.29 | 0.35 | | | 2.0 | | | | 1.2 | |
| 28 | | | 1.2/3.0 | Insol./sol. Ferric pyrophosphate | 0.29 | 0.35 | | | 2.3 | | | | 0.7 | |
| 29 | | | 3.0/3.0 | Insol./sol. Ferric pyrophosphate | 0.72 | 0.35 | | | 5.8 | | | | 1.0 | |
| 30 | | | 1.2/3.0 | Insol ferric pyro/sol Fe citrate | 0.29 | 0.66 | | | 2.1 | | | | 1.2 | |

*These compositions contain 0.3–0.5% tolytriazole for brass corrosion inhibition TABLE 3b

| | Ammonium Polyphosphate Sample | Insoluble Iron Oxide Added % | Type | Other Iron Containing Additive (%) | Additive | Fe. Content % insol. | % sol. | Corrosion (mpy) Neat Concentrate 70° F. total | 70° F. partial | 120° F. total | 120° F. partial | Diluted Solution 70° F. total | 70° F. partial | 120° F. total | 120° F. partial |
|---|---|---|---|---|---|---|---|---|---|---|---|---|---|---|---|
| 31 | SAMPLE 1 | | | 1.2/3.0 | Insol ferric ortho/sol. Ferric pyro | 0.37 | 0.35 | | | 3.1 | | | | 1.5 | |
| 32 | | | | 1.2/3.0 | Insol ferric ortho/sol. Ferric pyro | 0.37 | 0.35 | | | 2.2 | | | | 1.0 | |
| 33 | | | | 1.2/3.0 | Insol/sol. Ferric ortho | 0.37 | 0.41 | | | 1.9 | | | | 2.2 | |
| 34 | | | | 1.2/3.0 | Insol/sol. Ferric ortho | 0.37 | 0.41 | | | 1.9 | | | | 1.5 | |
| 35 | | | | 1.2/4.0 | Insol. Fe(III) orthophosphate/sol Fe(III) NH4 citrate | 0.37 | 0.70 | | | 2.3 | | | | 1.4 | |
| 36 | | | | 1.2/4.0 | Insol. Fe(III) orthophosphate/sol Fe(III) NH$_4$ citrate | 0.37 | 0.70 | | | 1.8 | | | | 1.2 | |
| 37 | | | | 1.2/3.0 | Insol. Fe oxalate 2H$_2$0/sol. Ferric pyrophosphate | 0.37 | 0.35 | | | 17.0 | | | | 1.9 | |
| 38 | | | | 1.2/3.0 | Insol. Fe oxalate/sol. Fe sulfate | 0.37 | 0.60 | | | 37.4 | | | | 5.8 | |
| 39 | SAMPLE 2 | 1.2 | Red Iron oxide | 3.0 | Sol. Ferric pyrophosphate | 0.84 | 0.35 | 1.2 | 0.9 | 10.1 | 5.2 | 3.7 | 3.7 | 1.4 | 1.7 |
| 40 | | 1.2 | Br. Iron oxide | 3.0 | Sol. Ferric citrate | 0.84 | 0.66 | | | 0.2 | | | | 0.4 | |
| 41 | SAMPLE 3 | 0.6 | Br. Iron oxide | 5.0 | Sol. Ferric citrate | 0.42 | 1.10 | | | 6.2 | | | | 0.5 | |
| 42 | | 1.2 | Br. Iron oxide | 3.0 | Sol. Ferric pyrophosphate | 0.84 | 0.45 | 2.8 | 2.7 | 110.1 | 70.2 | 11.0 | 6.7 | 7.6 | 3.5 |
| 43 | | 1.2 | Red Iron oxide | 3.0 | Sol. Ferric pyrophosphate | 0.84 | 0.35 | | | 33.2 | | | | 7.6 | |
| 44 | SAMPLE 4 | 1.2 | Red Iron oxide | 3.0 | Sol. Ferric pyrophosphate | 0.84 | 0.35 | 3.7 | | 76.5 | | 6.4 | | 0.8 | |
| 45 | SAMPLE 5[2] | 1.2 | Red Iron oxide | 3.0 | Sol. Ferric pyrophosphate | 0.84 | 0.35 | 2.3 | | 2.8 | | 2.8 | | 1.1 | |
| 46 | | 1.2 | Red Iron oxide | 4.0 | Sol. Ferric pyrophosphate | 0.84 | 0.46 | 1.8 | | 2.8 | | 2.6 | | 1.8 | |
| 48 | | 2.4 | Red Iron oxide | 3.0 | Sol. Ferric pyrophosphate | 1.68 | 0.35 | 1.4 | | 2.1 | | 2.7 | | 1.2 | |
| 49 | | 1.2 | Red Iron oxide | 3.0 | Sol. Ferric pyrophosphate | 0.84 | 0.35 | | | 4.0 | | | | 2.1 | |
| 50 | | 1.2 | Red Iron oxide | 3.0 | Sol. Ferric pyrophosphate | 0.84 | 0.35 | 1.6 | 1.0 | 2.4 | 1.7 | 2.0 | 3.2 | 1.1 | 2.0 |
| 51 | | 1.2 | Red Iron oxide | 3.0/3.0 | insol./sol Ferric pyrophosphate | 1.56 | 0.56 | 0.6 | | 5.4 | | 1.6 | | 0.9 | |
| 52 | SAMPLE 6[2] | 1.2 | Br. Iron oxide | 3.0 | Sol. Ferric pyrophosphate | 0.84 | 0.35 | 2.1 | 1.7 | 113.0 | 52.7 | 11.8 | 6.2 | 8.1 | 4.5 |

TABLE 3b-continued

| | | | | | | Corrosion (mpy) | | | | | | | |
|---|---|---|---|---|---|---|---|---|---|---|---|---|---|
| Ammonium Polyphosphate | Insoluble Iron Oxide Added | | Other Iron Containing Additive | | | Neat Concentrate | | | | Diluted Solution | | | |
| | | | | Fe. Content | | 70° F. | 70° F. | 120° F. | 120° F. | 70° F. | 70° F. | 120° F. | 120° F. |
| Sample | % | Type | (%) | Additive | % insol. | % sol. | total | partial | total | partial | total | partial | total | partial |
| 53 | | 1.2 Red Iron oxide | 3.0 | Sol. Ferric pyrophosphate | 0.84 | 0.35 | | | 21.0 | | | | 5.6 | |
| 54 | SAMPLE 7[(2)] | 1.2 Red Iron oxide | 3.0 | Sol. Ferric pyrophosphate | 0.84 | 0.35 | 4.2 | | 83.0 | | 3.8 | | 1.1 | |

(1) These compositions contain 0.3–0.5% tolytriazole for brass corrosion inhibition.
(2) Ammonium polyphosphate sample For comparative purposes, line 1 illustrates the average corrosion characteristics of neat concentrate and dilute solutions from Sample 1, taken from Table 1, line 2 illustrates the average aluminum corrosion rate of the concentrate and diluted ammonium polyphosphate (as illustrated in Table 2) when the neat material was admixed with small amounts of iron oxide pigment and Attapulgus clay. Samples 1-4 were 10-34-0 type ammonium polyphosphate samples obtained from various sources. Samples 5-7 were 11-37-0 type ammonium polyphosphate samples obtained from various sources.

The data in Tables 1 and 2 illustrate that corrosive attack of aluminum was most severe when exposed to the fire retardant concentrate and its solutions at elevated (120° F./49° C.) temperature in the totally immersed configuration. Consequently, the evaluation of corrosion inhibiting systems stressed testing under these conditions. Periodic testing at other conditions was conducted. Lines 3 through 6 illustrate the corrosion inhibiting effectiveness of various combinations of insoluble brown iron oxide and soluble ferric pyrophosphate. The results indicate that the USDA, Forest Service Specifications for corrosivity of fire retardants are met when 1.2% of the brown iron oxide is used in conjunction with 3.0% of the soluble ferric pyrophosphate. In addition, the results indicate that lower amounts of insoluble iron oxide result in unacceptable corrosion rates in the concentrated retardant solution.

Lines 7 through 12 illustrate the effectiveness of corrosion inhibiting systems similar to those described in the preceding paragraph, except red iron oxide is substituted for brown iron oxide. The results indicate that the red iron oxide is effective in reducing the aluminum corrosion of the concentrated and diluted ammonium polyphosphate although perhaps not quite as effective as the brown iron oxide.

Lines 13–22 illustrate the corrosion inhibiting effectiveness of mixtures of insoluble iron oxide and soluble ferric citrate. The results indicate that ferric citrate is an equally effective substitute for soluble ferric pyrophosphate. In addition, the results indicate that a mixture of brown iron oxide and 3.0% soluble ferric citrate is capable of reducing the corrosivity of the ammonium polyphosphate samples to within acceptable levels for compliance with U.S. Forest Service Specifications for corrosivity of fire retardants.

Lines 23 and 24 illustrate the use of ferric ammonium citrate as a substitute for ferric citrate. The results indicate that the soluble ferric compounds are as effective as ammonium citrate in reducing corrosion of aluminum by ammonium polyphosphate solutions.

Lines 27 through 38 illustrate the effectiveness of systems in which only uncolored, soluble and insoluble iron containing compounds are used rather than the relatively highly colored persistent iron oxides. This is important where true fugitive retardants are desired, whereby the color gradually fades when exposed to natural sunlight and disappears so as not to permanently stain that on which it is applied.

Lines 26 through 38 illustrate the effectiveness of mixtures of soluble and insoluble ferric pyrophosphate. Acceptable aluminum corrosion properties are obtained when 3.0% of the former and 1.2% of the latter are used as the corrosion inhibiting system in an ammonium polyphosphate solution. The results also indicate that an increased level of insoluble ferric pyrophosphate does not further reduce the corrosivity of the concentrate.

Lines 27 though 38 illustrate the aluminum corrosion inhibiting effectiveness of mixtures of the various soluble and insoluble iron compounds. Lines 37 and 38 revealed that, although effective, the tested ferrous salts were less effective at equivalent iron addition rates as compared to the ferric compounds.

Lines 39 through 44 illustrate the aluminum corrosion inhibiting effectiveness of various soluble and insoluble iron compounds when used in conjunction with 10-34-0 ammonium polyphosphate concentrates obtained from alternative sources. These data indicate that the amount and ratio of corrosion inhibitor necessary to reduce corrosivity to an acceptable level will need to be optimized dependent on the source and characteristics thereof.

Lines 45 through 54 illustrate the aluminum corrosion inhibiting effectiveness of the subject compounds when used in various sources of 11-37-0 type ammonium polyphosphate concentrate and their diluted solutions.

EXAMPLE 4

Corrosion Characteristics of Ammonium Polyphosphate Solutions Containing Water Soluble Iron Compounds Example 4 illustrates the effectiveness of water-soluble ferric pyrophosphate, ferric citrate and ferrous sulfate as aluminum corrosion inhibitors in ammonium polyphosphate solutions. In each sample, the indicated soluble iron compounds and 1.4% Attapulgus clay were admixed with neat ammonium polyphosphate. Aliquots were subsequently drawn from the concentrate and diluted with the prescribed amount of water. The aluminum corrosivity of both the concentrated fire retardants and their diluted solutions was determined in accordance with the aforementioned Forest Service Specifications. The results of this testing is shown in Table 4.

importance, mixtures of water soluble and water insoluble iron compounds generally provide superior performance.

EXAMPLE 5

Corrosion Characteristics of Ammonium Polyphosphate Solutions Containing Other Water Insoluble Iron Compounds Table 5 illustrates the effectiveness of water insoluble ferric orthophosphate, insoluble ferric pyrophosphate and

TABLE 4

| Ammonium Polyphosphate Samples | Soluble Iron Added | | Total Fe (%) | Aluminum Corrosion[1] | |
|---|---|---|---|---|---|
| | (%) | Additive | | Concentrate | Dilute Solution |
| Average Sample from Table 1 | 0 | None | 0 | 106.6–170.0 | 5.8–39.0 |
| 1 | 0.6 | Soluble ferric pyrophosphate | 0.07 | 150.6 | 1.5 |
| 2 | 3.0 | Soluble ferric pyrophosphate | 0.35 | 42.5 | 1.6 |
| 3 | 3.0 | Soluble ferric pyrophosphate | 0.35 | 75.4 | 1.2 |
| 4 | 3.0 | Soluble ferric pyrophosphate | 0.35 | 69.3 | 1.3 |
| 5 | 2.4 | Soluble ferric citrate | 0.53 | 113.1 | 2.5 |
| 6 | 3.0 | Soluble ferric citrate | 0.66 | 124.1 | 2.4 |
| 7 | 3.0 | Soluble ferric citrate | 0.66 | 17.0 | 1.1 |
| 8 | 3.0 | Ferrous sulfate·7H$_2$O | 0.60 | 27.9 | 3.1 |

(1) Aluminum 2024T3 coupons tested in the manner described in USDA, Forest Service specification 5100-304b. Values obtained when the corrosion cell was maintained at 120° F. (50° C.) for 90 days with the coupon totally immersed therein. The data is expressed in milli-inches per year.

The results indicate that both soluble ferric and ferrous iron containing salts show utility as aluminum corrosion inhibitors in ammonium polyphosphate solutions. Relatively small concentrations (0.35%) of soluble iron derived from a soluble ferric pyrophosphate decreased the corrosion rate of totally immersed aluminum exposed to 120° F. solutions of the diluted fire retardant to within the USDA Forest Service Specification requirements. The data illustrate that soluble iron containing compounds are most effective in controlling the corrosivity of diluted solutions. Since the corrosivity of both the concentrate and its diluted solutions is of ferrous oxalate as aluminum corrosion inhibitors in ammonium polyphosphate concentrates and their dilute solutions. 1.4% Attapulgus clay was mixed with the concentrated ammonium polyphosphate, with the exception of samples 6 and 7 which contained 0.7% and 2.8% Attapulgus clay, respectively. Samples 13, 18 and 24 contained, also, an insoluble iron oxide as a solution colorant. The resultant fire retardant concentrates and their dilute solutions were evaluated in terms of aluminum corrosivity in accordance with the USDA Forest Service Specification requirements. The results of the testing are shown in Table 5 below.

TABLE 5

| Ammonium Polyphosphate Samples | Iron Oxide Addition | | Other Insol. Fe Additive | | Total Fe. Content (%) | Neat concentrate | | | | Diluted Solution | | | |
|---|---|---|---|---|---|---|---|---|---|---|---|---|---|
| | | | | | | 70° F. Total | 70° F. partial | 120° F. total | 120° F. Partial | 70° F. total | 70° F. partial | 120° F. total | 120° F. partial |
| | % | Type | (%) | Additive | | Corrosion Rate (milli-inches per year) | | | | | | | |
| 1 Neat 10-34-0[1] | 0.0 | None | 0.0 | None | 0.00 | 9.1 | 5.2 | 140.6 | 79.5 | 10.8 | 6.9 | 16.0 | 9.4 |
| 2 Sample 1 | 0.0 | None | 1.2 | Ferric pyrophosphate | 0.29 | | | 2.9 | | | | 1.7 | |
| 3 Sample 2 | 0.0 | None | 2.4 | Ferric pyrophosphate | 0.58 | | | 9.4 | | | | 3.7 | |
| 4 Sample 3 | 0.0 | None | 3.0 | Ferric pyrophosphate | 0.72 | | | 3.5 | | | | 1.1 | |
| 5 Sample 4 | 0.0 | None | 3.0 | Ferric pyrophosphate | 0.72 | | | 6.5 | | | | 2.2 | |
| 6 Sample 5 | 0.0 | None | 3.0 | Ferric pyrophosphate | 0.72 | | | 2.1 | | | | 1.4 | |
| 7 Sample 6 | 0.0 | None | 3.0 | Ferric pyrophosphate | 0.72 | | | 3.6 | | | | 2.1 | |
| 8 Sample 7 | 0.0 | None | 3.0 | Ferric pyrophosphate | 0.72 | | | 1.0 | | | | 1.7 | |
| 9 Sample 8 | 0.0 | None | 2.4 | Ferric pyrophosphate | 0.58 | | | 10.7 | | | | 1.0 | |

TABLE 5-continued

| | | | | | Neat concentrate | | | | Diluted Solution | | | |
|---|---|---|---|---|---|---|---|---|---|---|---|---|
| Ammonium Polyphosphate | Iron Oxide Addition | | Other Insol. Fe Additive | Total Fe. Content | 70° F. Total | 70° F. partial | 120° F. total | 120° F. Partial | 70° F. total | 70° F. partial | 120° F. total | 120° F. partial |
| Samples | % | Type | (%) Additive | (%) | | | Corrosion Rate (milli-inches per year) | | | | | |
| 10 Sample 9 | 0.0 | None | 3.0 Ferric pyrophosphate | 0.72 | | | 5.5 | | | | 6.3 | |
| 11 Sample 10 | 0.0 | None | 3.0 Ferric pyrophosphate | 0.72 | 2.4 | | 6.2 | | 3.1 | | 1.1 | |
| 12 Sample 11 | 0.0 | None | 3.0 Ferric pyrophosphate | 0.72 | | | 3.4 | | | | 1.3 | |
| 13 Sample 12 | 0.0 | None | 3.0 Ferric pyrophosphate | 0.72 | | | 3.2 | | | | 2.2 | |
| 14 Sample 13[(2)] | 1.2 | Red Iron oxide | 0.0 None | 0.84 | 3.7 | 3.0 | 8.3 | 6.4 | 4.4 | 4.2 | 4.6 | 3.5 |
| 15 Sample 14 | 1.2 | Red Iron oxide | 3.0 Ferric pyrophosphate | 1.56 | 2.0 | 1.3 | 4.8 | 3.0 | 1.5 | 3.1 | 0.8 | 2.0 |
| 16 Sample 15 | 1.2 | Red Iron oxide | 3.0 Ferric pyrophosphate | 1.56 | 1.6 | | 6.2 | | 1.6 | | 1.0 | |
| 17 Sample 16 | 1.2 | Red Iron oxide | 3.0 Ferric pyrophosphate | 1.56 | 2.5 | | 0.7 | | 2.5 | | 0.6 | |
| 18 Sample 17 | 1.2 | Red Iron oxide | 3.0 Ferric pyrophosphate | 1.56 | 1.9 | 1.2 | 0.5 | 0.2 | 1.1 | 2.4 | 0.8 | 1.9 |
| 19 Sample 18 | 1.2 | Red Iron oxide | 3.0 Ferric pyrophosphate | 1.56 | 2.1 | | 2.7 | | 1.1 | | 0.8 | |
| 20 Sample 19 | 0.0 | None | 1.2 Ferric orthophosphate | 0.16 | | | 105.3 | | | | 1.7 | |
| 21 Sample 20 | 0.0 | None | 1.8 Ferric orthophosphate | 0.55 | | | 108.6 | | | | 3.8 | |
| 22 Sample 21 | 0.0 | None | 2.4 Ferric orthophosphate | 0.73 | | | 9.3 | | | | 4.1 | |
| 23 Sample 22 | 0.0 | None | 3.0 Ferric orthophosphate | 0.92 | | | 2.3 | | | | 4.2 | |
| 24 Sample 23 | 1.2 | Brown Iron oxide | 3.0 Ferric orthophosphate | 1.25 | | | 1.5 | | | | 1.0 | |
| 25 Sample 24 | 0.0 | None | 1.2 Ferrous oxalate | 0.37 | | | 90.0 | | | | 2.7 | |

(1) Average values from Table 1.
(2) See Table 2.

The corrosion inhibiting effectiveness of insoluble ferric pyrophosphate was shown by a comparison of the compositions containing only this component, lines 2–13, with line 1. The effectiveness was also shown by comparison with 1.2% red iron oxide, line 14. These comparisons illustrate the effectiveness of insoluble ferric pyrophosphate as an aluminum corrosion inhibitor for concentrated ammonium polyphosphate and its solutions. It was shown to be superior to red iron oxide when compared on an equal ferric iron level. Accordingly, the insoluble ferric pyrophosphate would be preferred in many applications since it is not highly colored like the conventional iron oxides, which result in highly visible and persistent discoloration of that on which it is applied. Consequently, inhibitor systems containing these components would be suitable for use in fugitive colored fire retardant formulations.

Lines 15–19 illustrate the further reduction in aluminum corrosion, which was obtained by combining iron oxide and ferric pyrophosphate in the same corrosion inhibiting system. The results indicate that several of these formulations met the USDA, Forest Service Specifications for corrosivity of aluminum in both the concentrate and dilute forms.

The data contained in lines 20 and 23 illustrate the effectiveness of insoluble ferric orthophosphate in inhibiting the corrosion of aluminum exposed to ammonium polyphosphate solutions. The results indicate that the pyrophosphate moiety may be somewhat superior to orthophosphate for inhibiting the corrosion of aluminum.

The data contained in line 24 indicates that increasing the ferric iron content of the corrosion inhibiting system by using mixtures of ferric orthophosphate and iron oxide is also an effective way of meeting the USDA, Forest Service Specifications for corrosivity of aluminum.

Line 25 in Table 5 illustrates the aluminum corrosion inhibiting effectiveness of small amounts of ferrous (FeII) iron when incorporated in ammonium polyphosphate concentrates and their dilute solutions.

EXAMPLE 6

Effectiveness of Azoles as Corrosion Inhibitors In Ammonium Polyphosphate Fire Retardant Compositions Example 6 illustrates the effectiveness of azoles as yellow brass corrosion inhibitors in concentrated ammonium polyphosphate based fire retardant formulations and in their dilute solutions. Each sample was prepared by mixing 1.4% Attapulgus clay, 1.2% red iron oxide and the indicated azole corrosion inhibitor in the neat, concentrated ammonium polyphosphate. Subsequently, the concentrates were diluted with water in the manner described herein. The samples were then tested in accordance with USDA Forest Service Specification requirements.

TABLE 6

THE IMPACT OF AZOLES ON THE CORROSION OF YELLOW BRASS EXPOSED TO CONCENTRATED AMMONIUMPOLYPHOSPHATE AND ITS DILUTED SOLUTIONS.*

| | Corrosion of exposed yellow brass (mpy) | | | | | | | |
|---|---|---|---|---|---|---|---|---|
| | Concentrated Retardant | | | | Diluted Solution | | | |
| Corrosion Inhibitor System | 70T** | 70P | 120T | 120P | 70T | 70P | 120T | 120P |
| None | 0.5 | 0.6 | 0.6 | 2.0 | 1.5 | 5.7 | 20.3 | 14.9 |
| 0.3% tolytriazole | | | 0.2 | | | | 0.3 | |
| 0.5% tolytriazole | 0.0 | 0.1 | 0.1 | 0.1 | 0.0 | 0.0 | 0.0 | 0.0 |
| 0.25% sodium tolyl triazole*** | | | 0.2 | | | | 0.1 | |
| 0.255% sodium tolyl-triazole+ | | | 0.2 | | | | 0.1 | |
| 0.425% sodium tolyl-triazole+ | | | 0.2 | | | | 0.1 | |
| 0.5% sodium tolyl-triazole*** | | | 0.1 | | | | 0.2 | |
| 0.5% sodium triazole++ | 0.1 | 0.1 | 0.1 | 0.1 | 0.1 | 0.3 | 0.3 | |
| 1.0% sodium triazole++ | 0.1 | 0.1 | 0.1 | 0.1 | 0.1 | 0.1 | 0.1 | |

*10-34-0 containing 1.4% Attapulgus clay and 1.2% red iron oxide in addition to the described inhibitor additive.
**70 and 120 refer to the solution storage temperature in ° F., T and P refer to total of partial immersion of the metal coupon in the retardant solution during storage.
***from a 50% aqueous solution of sodium tolytriazole.
+from an 85% aqueous solution of sodium tolytriazole
++from 100% sodium triazole.

The results indicate that azoles, including both tolytriazoles and salts thereof are effective corrosion inhibitors for yellow brass in ammonium polyphosphate concentrates and solutions. These data and others included in previous Examples illustrate the advantages of using azoles in conjunction with the iron containing inhibitors of this invention to reduce both aluminum and brass corrosivity of the fire retardant compositions to within desirable limits.

EXAMPLE 7

The Impact of Xanthan Biopolymer on Ammonium Polyphosphate Based Fire Retardants Table 7 illustrates the impact of xanthan on the viscosity and aluminum corrosion of iron inhibited ammonium polyphosphate based fire retardant concentrates and their dilute solutions. In addition to the biopolymer and iron containing corrosion inhibitor systems, most formulations contained a suspending clay. The samples were prepared by admixing ammonium polyphosphate solutions with various concentrations of Attapulgus clay, tolytriazole, iron oxide, biopolymer and ferric pyrophosphate or sodium citrate as indicated. The solutions were subjected to high shear mixing in order to activate or hydrate the various components, where necessary. Dilution was accomplished by admixing five volumes of water with one volume of the concentrated fire retardant composition. All references to xanthan in Tables 7a and 7b refer to a commercial grade of xanthan, Keltrol BT®, which has an average particle diameter less than about 100 microns.

Each concentrate and diluted solution was tested for aluminum corrosivity in accordance with the Forest Service Specification protocols and the viscosity of each concentrate and dilute solution was tested by methods of testing viscosity that are well-known in the art. The results are shown in Tables 7a and 7b.

TABLE 7a

| Formulation No. Components (wt. %) | USFS Corrosion Regm'ts | A | B | C | D | E | F | G | H | I | J | K | L |
|---|---|---|---|---|---|---|---|---|---|---|---|---|---|
| Ammonium Polyphosphate (conc.) | | 100.0 | 99.0 | 97.1 | 96.1 | 94.1 | 93.1 | 91.1 | 90.1 | 91.1 | 90.1 | 97.5 | 94.5 |
| Attapulgus clay | | | | 1.4 | 1.4 | 1.4 | 1.4 | 1.4 | 1.4 | 1.4 | 1.4 | | |
| tolytriazole | | | | 0.3 | 0.3 | 0.3 | 0.3 | 0.3 | 0.3 | 0.3 | 0.3 | 0.3 | 0.3 |
| Iron oxide | | | | 1.2 | 1.2 | 1.2 | 1.2 | 1.2 | 1.2 | 1.2 | 1.2 | 1.2 | 1.2 |
| Keltrol BT-xanthan gum | | | 1.0 | | 1.0 | | 1.0 | | 1.0 | | 1.0 | 1.0 | 1.0 |
| Ferric pyrophosphate (insol) | | | | | | 3.0 | 3.0 | 3.0 | 3.0 | 4.3 | 4.3 | | 3.0 |
| Ferric pyrophoshate (sol) | | | | | | | | 3.0 | 3.0 | | | | |
| Sodium citrate | | | | | | | | | | 1.7 | 1.7 | | |
| Total | | 100.0 | 100.0 | 100.0 | 100.0 | 100.0 | 100.0 | 100.0 | 100.0 | 100.0 | 100.0 | 100.0 | 100.0 |
| Concentrate Viscosity (cps)* | | | | | | | | | | | | | |
| Initial | | 63 | 70 | 123 | 191 | 221 | 202 | 321 | 245 | 238 | 226 | 81 | 95 |
| 14 days | | 63 | 70 | 333 | 318 | 233 | 196 | 280 | 290 | 338 | 378 | 78 | 98 |

TABLE 7a-continued

| Formulation No. Components (wt. %) | USFS Corrosion Regm'ts | A | B | C | D | E | F | G | H | I | J | K | L |
|---|---|---|---|---|---|---|---|---|---|---|---|---|---|
| 30 days | | 58 | 63 | 436 | 477 | 497 | 313 | 690 | 396 | 700 | 408 | 75 | 100 |
| 90 days | | 66 | 63 | 1000 | 1290 | 1310 | 1360 | 1200 | 740 | 1020 | 1510 | 66 | 88 |
| Aluminum Corrosion (mpy) | | | | | | | | | | | | | |
| 70T | <5.0 | 6.7 | 6.3 | 1.1 | 2.6 | 0.6 | 0.3 | 0.6 | 0.7 | 0.8 | 0.8 | 7.2 | 2.0 |
| 70P | <5.0 | 3.6 | 3.5 | 0.6 | 1.6 | 0.6 | 0.4 | 0.5 | 0.6 | 0.6 | 0.6 | 3.9 | 1.2 |
| 120T | <5.0 | 110.4 | 105.4 | 5.9 | 4.7 | 0.9 | 0.9 | 1.6 | 1.7 | 1.1 | 1.1 | 48.4 | 1.5 |
| 120P | <5.0 | 70.5 | 68.9 | 2.4 | 3.0 | 0.8 | 0.5 | 0.5 | 0.6 | 0.7 | 0.8 | 24.7 | 1.2 |
| Dilute Solution (5:1 mix ratio) Viscosity (cps)* | | | | | | | | | | | | | |
| Initial | | 5 | 163 | 8 | 163 | 8 | 177 | 8 | 187 | 8 | 192 | 165 | 173 |
| 14 days | | 11 | 48 | 11 | 155 | — | 156 | 8 | 185 | — | — | 229 | 169 |
| 30 days | | 6 | 20 | 8 | 147 | 8 | 155 | 10 | 175 | 8 | 160 | 148 | 160 |
| 90 days | | 6 | 12 | 10 | 118 | 8 | 53 | 8 | 113 | 10 | 107 | 73 | 103 |
| Aluminum Corrosion (mpy) | | | | | | | | | | | | | |
| 70T | <2.0 | 13.6 | 10.6 | 2.5 | 0.8 | 1.2 | 0.7 | 2.1 | 0.7 | 2.7 | 0.7 | 1.2 | 0.6 |
| 70P | <2.0 | 7.8 | 6.2 | 3.4 | 2.5 | 2.1 | 1.6 | 2.0 | 1.6 | 2.0 | 1.5 | 2.7 | 4.4 |
| 120T | <2.0 | 3.2 | 3.6 | 1.8 | 0.7 | 1.6 | 0.7 | 1.4 | 0.6 | 0.9 | 0.7 | 0.8 | 0.8 |
| 120P | <2.0 | 5.4 | 4.4 | 3.4 | 2.1 | 2.3 | 1.5 | 2.4 | 1.5 | 2.0 | 1.3 | 1.9 | 2.5 |

*Samples stored at 90° F. with steel coupon suspended therein. Sample homogenized prior to measuring viscosity TABLE 7b

| Formulation No. Components (wt. %) | USFS Corrosion Regm'ts | M | N | O | P | Q | R | S |
|---|---|---|---|---|---|---|---|---|
| Ammonium Polyphosphate (conc.) | | 97.0 | 94.1 | 91.1 | 88.1 | 88.1 | 95.5 | 92.5 |
| Attapulgus clay | | | 1.4 | 1.4 | 1.4 | 1.4 | | |
| tolytriazole | | | 0.3 | 0.3 | 0.3 | 0.3 | 0.3 | 0.3 |
| Iron oxide | | | 1.2 | 1.2 | 1.2 | 1.2 | 1.2 | 1.2 |
| Keltrol BT-xanthan gum | | 3.0 | 3.0 | 3.0 | 3.0 | 3.0 | 3.0 | 3.0 |
| Ferric pyrophosphate (insol) | | | | 3.0 | 3.0 | 4.3 | | |
| Ferric pyrophosphate (sol) | | | | | 3.0 | | | |
| Sodium citrate | | | | | | 1.7 | | |
| Total | | 100.0 | 100.0 | 100.0 | 100.0 | 100.0 | 100.0 | 100.0 |
| Concentrate Viscosity (cps)* | | | | | | | | |
| Initial | | 78 | 270 | 278 | 337 | 311 | 83 | 108 |
| 14 days | | 71 | 216 | 248 | 298 | 310 | 88 | 103 |
| 30 days | | 81 | 228 | 280 | 457 | 264 | 88 | 125 |
| 90 days | | 85 | 275 | 910 | 1010 | 760 | 80 | 163 |
| Aluminum Corrosion (mpy) | | | | | | | | |
| 70T | <5.0 | 5.6 | 2.5 | 0.7 | 0.7 | 0.7 | 6.3 | 1.4 |
| 70P | <5.0 | 3.3 | 1.6 | 0.6 | 0.5 | 0.6 | 3.7 | 1.1 |
| 120T | <5.0 | 95.9 | 1.1 | 0.7 | 0.6 | 0.7 | 25.4 | 1.2 |
| 120P | <5.0 | 58.9 | 1.3 | 0.5 | 0.4 | 0.6 | 12.4 | 0.9 |
| Dilute Solution (5:1 mix ratio) Viscosity (cps)* | | | | | | | | |
| Initial | | 1010 | 1090 | 1050 | 1090 | 1050 | 1050 | 1090 |
| 14 days | | 960 | 1040 | 1030 | 1110 | 1010 | 1010 | 1050 |
| 30 days | | 997 | 1040 | 1010 | 1090 | 396 | 1010 | 1040 |
| 90 days | | 960 | 990 | 1000 | 1050 | 1040 | 960 | 1000 |
| Aluminum Corrosion (mpy) | | | | | | | | |
| 70T | <2.0 | 9.5 | 1.5 | 0.8 | 0.8 | 0.9 | 1.4 | 0.7 |
| 70P | <2.0 | 6.1 | 2.5 | 1.6 | 1.7 | 1.7 | 2.3 | 1.4 |
| 120T | <2.0 | 2.5 | 0.8 | 0.7 | 0.7 | 0.8 | 1.2 | 0.6 |
| 120P | <2.0 | 3.2 | 1.3 | 1.2 | 0.9 | 1.1 | 1.8 | 1.3 |

*Samples stored at 90° F. with steel coupon suspended therein. Sample homogenized prior to measuring viscosity.

Comparison of the aluminum corrosivity of the neat ammonium polyphosphate solution (Column A in Table 7a) with uninhibited ammonium polyphosphate containing 1.0% (Column B in Table 7a) and 3.0% xanthan biopolymer (Column M in Table 7b), when added alone, has no significant impact on aluminum corrosivity. On the other hand, comparison of Columns A and C in Table 7a reveals the impact of suspended iron oxide on the aluminum corrosion of the ammonium polyphosphate solution. Although the impact of the suspended iron oxide is noteworthy, it is inadequate to reduce the aluminum corrosivity of the composition to within USDA Forest Service requirements.

Comparison of samples C and D reveals that the addition of 1.0% xanthan to ammonium polyphosphate compositions containing clay, tolytriazole and iron oxide further reduces the aluminum corrosivity of the concentrated fire retardant to within the U.S. Forest Service requirements, but the diluted solutions, while reduced somewhat, are still marginally unacceptable.

With reference to samples E, G and I, results indicate that the addition of 3.0% insoluble ferric pyrophosphate, 3.0% each of soluble and insoluble ferric pyrophosphate or a mixture of 4.3% insoluble ferric pyrophosphate and 1.7% sodium citrate to ammonium polyphosphate based fire retardants reduces the aluminum corrosivity of the concentrated ammonium polyphosphate fire retardants. However, diluted ammonium polyphosphate retardants containing the same iron additives were not significantly improved.

With reference to samples F, H and J, the addition of 1.0% xanthan to the compositions of samples E, G and I, reduces the aluminum corrosivity of the resultant concentrate and dilute solutions to within the U.S. Forest Service requirements in all testing conditions and situations.

The results also indicate that neat ammonium polyphosphate concentrate type fire retardants, sample A, exhibit a viscosity of about 65 cps, while its dilute solution has a viscosity of 5–10 cps. The addition of 1.0% xanthan biopolymer to the 11-37-0 ammonium polyphosphate sample, in concentrate, had no significant effect on viscosity.

The results indicate, with reference to samples M through S, the impact of increasing the concentration of xanthan biopolymer from 1.0% to 3.0% in the liquid fire retardant concentration. The data show that the addition of 1.0% biopolymer to an iron containing ammonium polyphosphate composition results in a further reduction in aluminum corrosivity. However, increased concentrations of xanthan biopolymer do not appear to be more effective. 1.0% xanthan biopolymer is sufficient to decrease the aluminum corrosion of formulations containing 3.0% ferric pyrophosphate to within Forest Service Specifications. However, additional xanthan biopolymer increases the viscosity of the diluted solution to within Forest Service Specifications for a high viscosity fire retardant solution but does not further reduce corrosion.

With reference to sample M, the results indicate that 3.0% xanthan biopolymer may have a slight impact on both the viscosity and aluminum corrosivity of concentrated ammonium polyphosphate type fire retardant compositions. The diluted concentrate exhibits a stable viscosity in the range of 1000 cps, however, its aluminum corrosivity is only slightly reduced. Accordingly, the biopolymer is reducing the aluminum corrosion by some other mechanism other than through viscosity modification. Accordingly, the biopolymer is enhancing the corrosive inhibition of the biopolymer/iron component system by use of a mechanism other than through viscosity modification.

Samples K and R further indicate that the addition of 1% biopolymer to ammonium polyphosphate type fire retardant concentrates has no significant impact on the viscosity of the concentrated product, but does reduce the high temperature aluminum corrosion of the concentrated composition by 50%. In addition, the results indicate that the addition of 3% biopolymer to the same reduces the high temperature aluminum corrosion of the concentrated composition by about 75% without significantly impacting the viscosity of the concentrate.

With reference to samples L and S, the results indicate that Forest Service aluminum corrosion requirements can be met in formulations that do not include a suspending agent, such as Attapulgus clay.

With reference to samples H and P, the addition of soluble ferric pyrophosphate to formulations containing insoluble ferric polyphosphate and xanthan biopolymers does not further improve aluminum corrosivity.

EXAMPLE 8

The Impact of Xanthan Biopolymers with Varying Particle Sizing on the Viscosity of Liquid Concentrate Fire Retardants Table 8 illustrates the impact of xanthan biopolymers of various weight average particle diameters on the rheological properties of ammonium polyphosphate fire retardant concentrates. The samples were prepared by admixing ammonium polyphosphate type fire retardant solutions with 3.0% of the xanthan biopolymers of various weight average particle diameters, as indicated in Table 8. Dilution was accomplished by admixing five volumes of water with one volume of the concentrated fire retardant.

The viscosity of each dilute solution was tested by methods of testing viscosity that are well-known in the art. The rapid viscosity increase upon dilution (Diluted Viscosity— 10 minutes) was tested. The stable viscosity upon dilution (Diluted Viscosity—30 days) was tested. The rapid viscosity increase of the solution after one-year (After 1 Year (cps)) was tested. The stable viscosity of the solution after one-year (After 1 Year (cps)) was tested. The results are shown below in Table 8.

TABLE 8

PROPERTIES OF LIQUID CONCENTRATE FIRE RETARDANTS THICKENED WITH XANTHAN BIOPOLYMER WITH VARYING PARTICLE SIZING

| Xanthan Biopolymer | WT. Ave. Dia (:) | Diluted Viscosity | | Hydration Rate** | After 1 Year ()cps) | |
|---|---|---|---|---|---|---|
| | | 10 Minutes | 30 Days | | 10 Minutes | 30 Days |
| Rhodigel SM ® | 31 | 1433 | 1447 | 99 | −40 | −40 |
| Jungbunzlauer ST ® | 38 | 1493 | 1543 | 98 | +10 | −53 |
| Keltrol BT ® | 70 | 1147 | 1197 | 96 | +126 | +6 |
| ADM ® 40 mesh | 98 | 1070 | 1690 | 63 | +337 | +30 |
| ADM dispersible | ~105 | 250 | 1537 | 16 | +897 | +80 |
| Kelzan ® (uncoated) | 110 | 433 | 547 | 79 | NA | NA |
| Kelzan S ® (coated) | 150 | 120 | 463 | 26 | — | — |

**10 minute viscosity as a % of maximum viscosity achieved.

The results indicate that liquid concentrate fire retardant compositions comprising biopolymers having particle diameters in the range of about 31 to 70 microns exhibit ideal Theological properties. However, fire retardant concentrates comprised of biopolymers having weight average particle diameters larger than about 100 microns do not exhibit desirable Theological properties.

EXAMPLE 9

The Impact of Particle Sizing on the Viscosity of Biopolymers in Ammonium Polyphosphate Type Fire Retardants Table 9 illustrates the particle sizing and performance of several xanthan-type biopolymers in comparison with standard hydroxypropyl guar gum in liquid fire retardant concentrates. The samples were prepared by admixing 3.0% xanthan type biopolymer or guar gum, as indicated below in Table 9, with concentrated ammonium polyphosphate type fire retardants. Dilution was accomplished by admixing about five volumes of water with one volume of each dilute fire retardant composition.

The viscosity of each sample ammonium polyphosphate solution was tested by the methods described in Example 8. The results are shown in Table 9 below.

microns also fails to exhibit desirable rheological properties. Specifically, ammonium polyphosphate type fire retardant concentrates containing guar gum have highly unstable rheological characteristics, which make their use undesirable. Accordingly, in one embodiment the compositions of the invention do not contain guar gum.

EXAMPLE 10

The Impact of Particle Sizing and Biopolymer Type on the Viscosity of Biopolymers in Ammonium Polyphosphate Solutions Table 10 illustrates the particle sizing and performance of xanthan-type biopolymers with welan and rhamsan biopolymers in ammonium polyphosphate type liquid fire retardants. The samples were prepared by admixing about 91.1% ammonium polyphosphate solution, 1.2% attapulgus clay, 0.3% tolytriazole, 3.0% insoluble ferric pyrophosphate and 3.0% of the biopolymer indicated in Tables 10a and 10b. The biopolymers used included Kelzan®, Kelzan S®, Keltrol BT®, Kelcorete® and a rhamsan biopolymer all commercially available from CP Kelco, Wilmington, Del. Kelzan® is an uncoated, conventional xanthan biopolymer, while Kelzan S® is a conventional xanthan biopolymer with an

TABLE 9

IMPACT OF PARTICLE SIZING ON THE PEFORMANCE OF XANTHAN BIOPOLYMERS IN AMMONIUM POLYPHOSPHATE TYPE FIRE RETARDANTS

| Sieve Size | Sieve Opening (microns) | Guar Gum (for comparison | Keltrol BT ® | Kelzan ® (uncoated) | Kelzan S ® Glyoxal coated | Rhodagel SM ® | ADM 40 mesh | ADM Dispersible | Jungbunzlauer FST ® |
|---|---|---|---|---|---|---|---|---|---|
| 60 | 250 | | 0.0 | 9.0 | 22.0 | 0.0 | 2.6 | 4.0 | 0.0 |
| 80 | 177 | | 0.6 | 19.3 | 41.2 | 0.0 | 17.4 | 15.1 | 0.0 |
| 120 | 125 | | 18.9 | 42.9 | 58.3 | 0.0 | 37.7 | 36.2 | 0.0 |
| 230 | 63 | | 56.1 | 77.2 | 79.1 | 2.2 | 68.9 | 75.7 | 2.2 |
| 270 | 53 | | 65.1 | 83.2 | 83.4 | 5.5 | 76.3 | 84.2 | 15.6 |
| 325 | 44 | | 71.1 | 86.9 | 86.3 | 14.7 | 81.5 | 88.9 | 35.8 |
| 400 | 38 | | 76.5 | 89.9 | 88.6 | 28.2 | 85.8 | 91.9 | 50.1 |
| <400 | <38 | | 23.6 | 10.1 | 11.4 | 71.8 | 14.3 | 8.1 | 49.9 |
| Particle Diameter ($\mu$) weight average) | | >100 | 70 | 110 | 150 | 31 | 98 | ~105 | 38 |
| Diluted Solution Viscosity (cps) | | | | | | | | | |
| Fresh Concentrate | | | | | | | | | |
| 10 minutes | | 1597 | 1147 | 433 | 120 | 1433 | 1070 | 250 | 1493 |
| 30 days | | 63 | 1197 | 547 | 463 | 1447 | 1690 | 1537 | 1543 |
| One-Year Old Concentrate | | | | | | | | | |
| 10 minutes | | ~10 | 1283 | NA | 310* | 1393 | 1407 | 1147 | 1503 |
| 30 days | | ~10 | 1200 | NA | 697* | 1407 | 1720 | 1617 | 1490 |

*diluted 30 days after preparation of the concentrate

The results indicate that fire retardant concentrates comprising xanthan-type biopolymers in the range of about 31 to about 70 microns in diameter exhibit ideal rheological properties. However, fire retardant concentrates comprised of biopolymers having particle diameters larger than about 100 microns do not exhibit desirable rheological properties. Fire retardant concentrates comprising guar gum having a weight average particle diameter greater than about 100 applied surface coating. Keltrol BT® is a xanthan biopolymer having a particle diameter less than about 100 microns. Kelcocrete is a welan type biopolymer. The viscosity of each concentrate was measured by methods described in Example 8. Then, each sample was diluted with water at a mix ratio of 5 volumes of water per volume of concentrate. The 10-minute and 18-hour viscosity of the diluted sample was measured and the samples were stored in a laboratory at a temperature of about 70°–74° F. for varying periods of time, re-diluted and viscosity measured. The viscosity of each sample was measured at 10 minutes, 1 hour, 24 hours, 7 days, 15 days, 21 days and 28 days after preparation of the concentrated fire retardant. The results are shown in Tables 10a and 10b below.

EXAMPLE 11
Impact of Use Levels of Biopolymers and Iron Additives on the Viscosity of Ammonium Polyphosphate Solutions The optimal use levels of mixtures of biopolymer and insoluble ferric pyrophosphate and insoluble ferric pyro- TABLE 10a IMPACT OF PARTICLE SIZING AND BIOPOLYMER TYPE ON THE VISCOSITY OF AMMONIUM POLYPHOSPHATE TYPE FIRE RETARDANTS

| Biopolymer | Kelzan ® | Kelzan S ® | Keltrol BT ® | Kelcocrete ® | rhamsan |
|---|---|---|---|---|---|
| Concentrate Viscosity (CPS) | 196 | 198 | 189 | 195 | 199 |
| Initial Dilution (CPS) | | | | | |
| 10 min. | 433 | 140 | 1100 | 630 | 570 |
| 18. hrs. | 430 | 170 | 1060 | 1100 | 760 |
| 24 hrs. after Dilution | | | | | |
| 10 min. | 563 | 173 | 1093 | 543 | 500 |
| 18 hrs. | 557 | 203 | 1093 | 1027 | 800 |
| 7 Days after Dilution | | | | | |
| 10 min. | 550 | 98 | 1040 | 576 | 507 |
| 60 min. | 555 | 150 | 1057 | 700 | 620 |
| 24 hrs. | 590 | 187 | 1057 | 1043 | 840 |

TABLE 10b

IMPACT OF PARTICLE SIZING AND BIOPOLYMER TYPE ON THE VISCOSITY OF AMMONIUM POLYPHOSPHATE TYPE FIRE RETARDANTS

| Biopolymer | Kelzan ® | Kelzan S ® | Keltrol BT ® | Kelcocrete ® | rhamsan |
|---|---|---|---|---|---|
| Concentrate Viscosity (CPS) | 196 | 198 | 189 | 195 | 199 |
| 15 Days after Dilution | | | | | |
| 10 min. | 490 | 160 | 1047 | 440 | 467 |
| 60 min. | 503 | 177 | 1077 | 617 | 550 |
| 24 hrs. | 540 | 217 | 1103 | 1010 | 823 |
| 21 Days after Dilution | | | | | |
| 10 min. | 710 | 243 | 1083 | 410 | 550 |
| 60 min. | 747 | 247 | 1107 | 570 | 663 |
| 24 hrs. | 687 | 397 | 1043 | 937 | 837 |
| 28 Days after Dilution | | | | | |
| 10 min. | 547 | 200 | 1043 | 937 | 837 |
| 60 min. | 563 | 237 | 1063 | 650 | 710 |
| 24 hrs. | 613 | 260 | 1057 | 1047 | 903 |

The results indicate that welan and rhamsan type biopolymers thicken more slowly than xanthan type biopolymers but are effective at increasing the viscosity of ammonium polyphosphate type fire retardant solutions. Xanthan type biopolymers having a particle diameter of less than about 100 microns, however, rapidly increase the viscosity of ammonium polyphosphate type fire retardants upon dilution. Conventional biopolymers, e.g. xanthan type biopolymers having particle diameters greater than about 100 microns, fail to develop the viscosity of the fire retardants in a timely manner. Accordingly, both coated and uncoated conventional biopolymers are unsuitable for use in thickening ammonium polyphosphate type fire retardants. In addition, the long-term data, i.e. measured viscosity 7, 15, 21 and 28 days after dilution, indicate that there is no particular change in the performance of the various biopolymers during storage in ammonium polyphosphate based fire retardants.

phosphate when used to reduce the aluminum corrosion level of liquid ammonium polyphosphate type fire retardants and their dilute solutions. Formulations were prepared by admixing a fertilizer grade ammonium polyphosphate type fire retardants with Attapulgus clay, tolytriazole, and in some cases, iron oxide. Biopolymers having average particle diameters of less than 100 microns and insoluble ferric pyrophosphate were added as indicated. Each formulation was prepared by admixing the dry components separately to the ammonium polyphosphate, while high shear mixing at approximately 1000 rpm for about 2 hours. High shear was used to hydrate the clay and disperse the insoluble components. Dilute solutions were prepared by admixing 1 part concentrate with 5 parts tap water. The concentrate formulations and their dilute solutions were tested in accordance with all four of the test conditions prescribed by the U.S. Forest Service Specifications, described herein. The results are shown below in Tables 11a, 11b and 11c.

TABLE 11A

| Formulation Components (wt. %) | A | B | C | D | E | F | G | H | I | J | K | L | M | N | O |
|---|---|---|---|---|---|---|---|---|---|---|---|---|---|---|---|
| Ammonium Polyphosphate | 100.0 | 93.10 | 96.80 | 95.80 | 94.80 | 96.55 | 95.55 | 94.55 | 96.30 | 95.30 | 94.30 | 96.50 | 95.50 | 96.25 | 95.25 |
| Attapulgus clay | — | 1.40 | 1.40 | 1.40 | 1.40 | 1.40 | 1.40 | 1.40 | 1.40 | 1.40 | 1.40 | 1.40 | 1.40 | 1.40 | 1.40 |
| Tolyltriazole | — | 0.30 | 0.30 | 0.30 | 0.30 | 0.30 | 0.30 | 0.30 | 0.30 | 0.30 | 0.30 | 0.30 | 0.30 | 0.30 | 0.30 |
| Iron Oxide (Red) | — | 1.20 | — | — | — | — | — | — | — | — | — | — | — | — | — |
| Iron Oxide (Brown) | — | — | — | — | — | — | — | — | — | — | — | — | — | — | — |
| Keltrol BT | — | 1.00 | 0.50 | 0.50 | 0.50 | 0.75 | 0.75 | 0.75 | 1.00 | 1.00 | 1.00 | 0.30 | 0.30 | 0.30 | 0.30 |
| Ferric Pyrophosphate (Insol.) | — | 3.00 | 1.00 | 2.00 | 3.00 | 1.00 | 2.00 | 3.00 | 1.00 | 2.00 | 3.00 | 0.50 | 0.50 | 0.75 | 0.75 |
|  |  |  |  |  |  |  |  |  |  |  |  | 1.00 | 2.00 | 1.00 | 2.00 |
|  | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| Concentrate Viscosity (cps)* |  |  |  |  |  |  |  |  |  |  |  |  |  |  |  |
| Initial | 61 | 193 | 148 | 161 | 157 | 150 | 145 | 160 | 150 | 166 | 167 | 168 | 156 | 161 | 173 |
| 14 days | 57 | 421 | 363 | 173 | 218 | 365 | 256 | 198 | 193 | 208 | 187 | 210 | 168 | 175 | 220 |
| 30 days | 70 | 430 | 390 | 205 | 230 | 390 | 433 | 285 | 273 | 325 | 373 | 305 | 418 | 308 | 345 |
| 90 days | 61 | 1850 | 1940 | 750 | 1150 | 1010 | 1360 | 1310 | 1010 | 860 | 1390 | 900 | 1430 | 1000 | 1050 |
| Aluminum Corrosion (mpy) |  |  |  |  |  |  |  |  |  |  |  |  |  |  |  |
| 70T ≦5.0 | 4.8 | 0.4 | 3.6 | 0.9 | 0.6 | 3.8 | 1.0 | 0.6 | 3.6 | 1.3 | 0.9 | 2.9 | 1.2 | 2.7 | 1.0 |
| 70P ≦5.0 | 2.6 | 0.5 | 1.7 | 0.6 | 0.5 | 2.0 | 0.8 | 0.5 | 1.9 | 0.9 | 0.7 | 1.6 | 0.7 | 1.4 | 0.7 |
| 120T ≦5.0 | 112.4 | 0.7 | 18.9 | 1.2 | 1.0 | 15.2 | 1.1 | 0.9 | 11.9 | 1.5 | 1.1 | 7.1 | 1.2 | 5.3 | 0.9 |
| 120P ≦5.0 | 69.4 | 0.5 | 43.9 | 0.8 | 0.6 | 16.2 | 0.9 | 0.6 | 46.4 | 0.9 | 0.8 | 3.7 | 0.7 | 2.8 | 0.5 |
| Dilute solution (5:1 mix ratio) Viscosity (cps)* |  |  |  |  |  |  |  |  |  |  |  |  |  |  |  |
| Initial | 5 | 146 | 50 | 50 | 53 | 105 | 98 | 100 | 153 | 172 | 159 | 53 | 52 | 109 | 103 |
| 14 days | 5 | 130 | 30 | 43 | 40 | 85 | 78 | 85 | 138 | 155 | 143 | 50 | 45 | 91 | 97 |
| 30 days | 5 | 132 | 31 | 37 | 33 | 90 | 80 | 84 | 125 | 145 | 126 | 33 | 61 | 73 | 79 |
| 90 days | 5 | 90 | 18 | 13 | 19 | 23 | 43 | 23 | 28 | 70 | 40 | 15 | 15 | 23 | 29 |
| Aluminum Corrosion (mpy) |  |  |  |  |  |  |  |  |  |  |  |  |  |  |  |
| 70T ≦2.0 | 11.3 | 0.7 | 1.3 | 1.0 | 1.0 | 1.4 | 1.1 | 0.8 | 1.2 | 0.8 | 0.8 | 1.2 | 1.3 | 1.5 | 1.0 |
| 70P ≦2.0 | 6.8 | 1.9 | 3.9 | 3.1 | 3.0 | 3.5 | 3.3 | 2.9 | 3.6 | 2.9 | 2.4 | 3.2 | 3.1 | 3.3 | 2.8 |
| 120T ≦2.0 | 5.1 | 0.8 | 0.9 | 0.6 | 0.6 | 0.8 | 0.7 | 0.4 | 0.7 | 0.5 | 0.7 | 1.2 | 1.3 | 0.7 | 0.5 |
| 120P ≦2.0 | 5.8 | 1.5 | 1.7 | 2.3 | 2.2 | 1.8 | 2.5 | 1.6 | 2.4 | 1.7 | 1.2 | 1.9 | 2.6 | 2.1 | 2.0 |

*Samples stored at 90° F. with steel coupon suspended therein. Samples homogenized prior to measuring viscosity.

TABLE 11b

| Formulation Components (wt. %) | C | F | I | L | N | D | G | J | M | O | B | E | H | K |
|---|---|---|---|---|---|---|---|---|---|---|---|---|---|---|
| Ammonium Polyphosphate | 96.80 | 96.55 | 96.30 | 96.50 | 96.25 | 95.80 | 95.55 | 95.30 | 95.50 | 92.25 | 93.1 | 94.80 | 94.55 | 94.30 |
| Attapulgus clay | 1.40 | 1.40 | 1.40 | 1.40 | 1.40 | 1.40 | 1.40 | 1.40 | 1.40 | 1.40 | 1.4 | 1.40 | 1.40 | 1.40 |
| Tolyltriazole | 0.30 | 0.30 | 0.30 | 0.30 | 0.30 | 0.30 | 0.30 | 0.30 | 0.30 | 0.30 | 0.3 | 0.30 | 0.30 | 0.30 |
| Iron Oxide (Red) | — | — | — | — | — | — | — | — | — | — | 1.2 | — | — | — |
| Iron Oxide (Brown) | — | — | — | 0.30 | 0.30 | — | — | — | 0.30 | 0.30 | — | — | — | — |
| Keltrol BT | 0.50 | 0.75 | 1.00 | 0.50 | 0.75 | 0.50 | 0.75 | 1.00 | 0.50 | 0.75 | 1.00 | 0.50 | 0.75 | 1.00 |
| Ferric Pyrophosphate (Insol.) | 1.00 | 1.00 | 1.00 | 1.00 | 1.00 | 2.00 | 2.00 | 2.00 | 2.00 | 2.00 | 3.00 | 3.00 | 3.00 | 3.00 |
|  | 100.0 | 100.0 | 100.0 | 100.0 | 100.0 | 100.0 | 100.0 | 100.0 | 100.0 | 100.0 | 100.0 | 100.0 | 100.0 | 100.0 |
| Concentrate Viscosity (cps)* |  |  |  |  |  |  |  |  |  |  |  |  |  |  |
| Initial | 148 | 150 | 150 | 168 | 161 | 161 | 145 | 166 | 156 | 173 | 193 | 157 | 160 | 167 |
| 14 days | 363 | 365 | 193 | 210 | 175 | 173 | 256 | 208 | 168 | 220 | 421 | 218 | 198 | 187 |
| 30 days | 390 | 390 | 273 | 305 | 308 | 205 | 433 | 325 | 418 | 345 | 430 | 230 | 285 | 373 |
| 90 days | 1940 | 1010 | 1010 | 900 | 1000 | 750 | 1360 | 860 | 1430 | 1050 | 1850 | 1150 | 1310 | 1390 |
| Aluminum Corrosion (mpy) |  |  |  |  |  |  |  |  |  |  |  |  |  |  |
| 70T ≦5.0 | 3.6 | 3.8 | 3.6 | 2.9 | 2.7 | 0.9 | 1.0 | 1.3 | 1.2 | 1.0 | 0.4 | 0.6 | 0.6 | 0.9 |
| 70P ≦5.0 | 1.7 | 2.0 | 1.9 | 1.6 | 1.4 | 0.6 | 0.8 | 0.9 | 0.7 | 0.7 | 0.5 | 0.5 | 0.5 | 0.7 |
| 120T ≦5.0 | 18.9 | 15.2 | 11.9 | 7.1 | 5.3 | 1.2 | 1.1 | 1.5 | 1.2 | 0.9 | 0.7 | 1.0 | 0.9 | 1.1 |
| 120P ≦5.0 | 43.9 | 16.2 | 46.4 | 3.7 | 2.8 | 0.8 | 0.9 | 0.9 | 0.7 | 0.5 | 0.5 | 0.6 | 0.6 | 0.8 |
| Dilute solution (5:1 mix ratio) Viscosity (cps)* |  |  |  |  |  |  |  |  |  |  |  |  |  |  |
| Initial | 50 | 105 | 153 | 53 | 109 | 50 | 98 | 172 | 52 | 103 | 146 | 53 | 100 | 159 |
| 14 days | 30 | 85 | 138 | 50 | 91 | 43 | 78 | 155 | 45 | 97 | 130 | 40 | 85 | 143 |
| 30 days | 31 | 90 | 125 | 33 | 73 | 37 | 80 | 145 | 61 | 79 | 132 | 33 | 84 | 126 |
| 90 days | 18 | 23 | 28 | 15 | 23 | 13 | 43 | 70 | 15 | 29 | 90 | 19 | 23 | 40 |
| Aluminum Corrosion (mpy) |  |  |  |  |  |  |  |  |  |  |  |  |  |  |
| 70T ≦2.0 | 1.3 | 1.4 | 1.2 | 1.2 | 1.5 | 1.0 | 1.1 | 0.8 | 1.3 | 1.0 | 0.7 | 1.0 | 0.8 | 0.8 |
| 70P ≦2.0 | 3.9 | 3.5 | 3.6 | 3.2 | 3.3 | 3.1 | 3.3 | 2.9 | 3.1 | 2.8 | 1.9 | 3.0 | 2.9 | 2.4 |
| 120T ≦2.0 | 0.9 | 0.8 | 0.7 | 1.2 | 0.7 | 0.6 | 0.7 | 0.5 | 1.3 | 0.5 | 0.8 | 0.6 | 0.4 | 0.7 |
| 120P ≦2.0 | 1.7 | 1.8 | 2.4 | 1.9 | 2.1 | 2.3 | 2.5 | 1.7 | 2.6 | 2.0 | 1.5 | 2.2 | 1.6 | 1.2 |

TABLE 11c

| Formulation Components (wt. %) | C | D | E | L | M | F | G | H | N | O | B | I | J | K |
|---|---|---|---|---|---|---|---|---|---|---|---|---|---|---|
| Ammonium Polyphosphate | 96.80 | 95.80 | 94.80 | 96.50 | 95.50 | 96.55 | 95.55 | 94.55 | 96.25 | 95.25 | 93.1 | 96.30 | 95.30 | 94.30 |
| Attapulgus clay | 1.40 | 1.40 | 1.40 | 1.40 | 1.40 | 1.40 | 1.40 | 1.40 | 1.40 | 1.40 | 1.4 | 1.40 | 1.40 | 1.40 |
| Tolyltriazole | 0.30 | 0.30 | 0.30 | 0.30 | 0.30 | 0.30 | 0.30 | 0.30 | 0.30 | 0.30 | 0.3 | 0.30 | 0.30 | 0.30 |
| Iron Oxide (Red) | — | — | — | — | — | — | — | — | — | — | 1.2 | — | — | — |
| Iron Oxide (Brown) | — | — | — | 0.30 | 0.30 | — | — | 0.30 | 0.30 | — | — | — | — | — |
| Keltrol BT | 0.50 | 0.50 | 0.50 | 0.50 | 0.50 | 0.75 | 0.75 | 0.75 | 0.75 | 0.75 | 1.00 | 1.00 | 1.00 | 1.00 |
| Ferric Pyrophosphate (Insol.) | 1.00 | 2.00 | 3.00 | 1.00 | 2.00 | 1.00 | 2.00 | 3.00 | 1.00 | 2.00 | 3.00 | 1.00 | 2.00 | 3.00 |
|  | 100.0 | 100.0 | 100.0 | 100.0 | 100.0 | 100.0 | 100.0 | 100.0 | 100.0 | 100.0 | 100.0 | 100.0 | 100.0 | 100.0 |
| Concentrate Viscosity (cps)* |  |  |  |  |  |  |  |  |  |  |  |  |  |  |
| Initial | 148 | 161 | 157 | 168 | 156 | 150 | 145 | 160 | 161 | 173 | 193 | 150 | 166 | 167 |
| 14 days | 363 | 173 | 218 | 210 | 168 | 365 | 256 | 198 | 175 | 220 | 421 | 193 | 208 | 187 |
| 30 days | 390 | 205 | 230 | 305 | 418 | 390 | 433 | 285 | 308 | 345 | 430 | 273 | 325 | 373 |
| 90 days | 1940 | 750 | 1150 | 900 | 1430 | 1010 | 1360 | 1310 | 1000 | 1050 | 1850 | 1010 | 860 | 1390 |
| Aluminum Corrosion (mpy) |  |  |  |  |  |  |  |  |  |  |  |  |  |  |
| 70T ≦5.0 | 3.6 | 0.9 | 0.6 | 2.9 | 1.2 | 3.8 | 1.0 | 0.6 | 2.7 | 1.0 | 0.4 | 3.6 | 1.3 | 0.9 |
| 70P ≦5.0 | 1.7 | 0.6 | 0.5 | 1.6 | 0.7 | 2.0 | 0.8 | 0.5 | 1.4 | 0.7 | 0.5 | 1.9 | 0.9 | 0.7 |
| 120T ≦5.0 | 18.9 | 1.2 | 1.0 | 7.1 | 1.2 | 15.2 | 1.1 | 0.9 | 5.3 | 0.9 | 0.7 | 11.9 | 1.5 | 1.1 |
| 120P ≦5.0 | 43.9 | 0.8 | 0.6 | 3.7 | 0.7 | 16.2 | 0.9 | 0.6 | 2.8 | 0.5 | 0.5 | 46.4 | 0.9 | 0.8 |
| Dilute solution (5:1 mix ratio) Viscosity (cps)* |  |  |  |  |  |  |  |  |  |  |  |  |  |  |
| Initial | 50 | 50 | 53 | 53 | 52 | 105 | 98 | 100 | 109 | 103 | 146 | 153 | 172 | 159 |
| 14 days | 30 | 43 | 40 | 50 | 45 | 85 | 78 | 85 | 91 | 97 | 130 | 138 | 155 | 143 |
| 30 days | 31 | 37 | 33 | 33 | 61 | 90 | 80 | 84 | 73 | 79 | 132 | 125 | 145 | 126 |
| 90 days | 18 | 13 | 19 | 15 | 15 | 23 | 43 | 23 | 23 | 29 | 90 | 28 | 70 | 40 |
| Aluminum Corrosion (mpy) |  |  |  |  |  |  |  |  |  |  |  |  |  |  |
| 70T ≦2.0 | 1.3 | 1.0 | 1.0 | 1.2 | 1.3 | 1.4 | 1.1 | 0.8 | 1.5 | 1.0 | 0.7 | 1.2 | 0.8 | 0.8 |
| 70P ≦2.0 | 3.9 | 3.1 | 3.0 | 3.2 | 3.1 | 3.5 | 3.3 | 2.9 | 3.3 | 2.8 | 1.9 | 3.6 | 2.9 | 2.4 |
| 120T ≦2.0 | 0.9 | 0.6 | 0.6 | 1.2 | 1.3 | 0.8 | 0.7 | 0.4 | 0.7 | 0.5 | 0.8 | 0.7 | 0.5 | 0.7 |
| 120P ≦2.0 | 1.7 | 2.3 | 2.2 | 1.9 | 2.6 | 1.8 | 2.5 | 1.6 | 2.1 | 2.0 | 1.5 | 2.4 | 1.7 | 1.2 |

The results indicate that the incorporation of some iron oxide within the fire retardant compositions of the invention, or increased concentrations of other iron containing inhibitors will be necessary to meet U.S. Forest Service requirements. Fire retardant concentrates that include 1.2% iron oxide, 3% ferric pyrophosphate and 1% biopolymer, and their diluted solutions, meet the U.S. Forest Service Specification requirements. The viscosity of the fire retardant concentrates containing 1% biopolymer gradually increased from about 150 to 200 cps immediately after manufacture to 1000 to 2000 cps. After three months of storage at 90° F., and upon dilution, the solution viscosity was in the range of 100 to 200 cps.

In view of the above, it is seen that the various objects and features of the invention are achieved and other advantages and results are obtained. Variations and modification may be made to the various steps and compositions of the invention without departing from the scope of the invention.

We claim:

1. A fire retardant composition comprising:
   at least one fire retardant comprised of at least one ammonium polyphosphate and at least one biopolymer that is not guar gum having a weight average particle diameter less than about 100 microns.

2. The composition of claim 1 further comprising at least one additive selected from a group of additives consisting of suspending agents, coloring agents, surfactants, stabilizers, corrosion inhibitors, opacifying pigments and any combination thereof.

3. The composition of claim 2 wherein said coloring agent is at least one coloring agent selected from a group of coloring agents consisting of fugitive coloring agents, non-fugitive coloring agents and opacifying pigments.

4. The composition of claim 2 wherein said suspending agent is at least one suspending agent selected from a group consisting of Attapulgus, Sepiolite, Fuller's earth, Montmorillonite and Kaolin clays.

5. The composition of claim 1 further comprising additional water.

6. The composition of claim 5 wherein said composition comprises in the range of about 0.00224% to about 1.12% said biopolymer.

7. The composition of claim 5 wherein said composition comprises about 0.112% said biopolymer.

8. The composition of claim 5 wherein said composition comprises at least 0.112% said biopolymer.

9. The composition of claim 5 wherein said composition comprises about 0.224% said biopolymer.

10. The composition of claim 5 wherein said composition comprises about 0.672% said biopolymer.

11. The composition of claim 1 comprising in the range of about 0.01% to about 5.0% said biopolymer.

12. The composition of claim 1 comprising about 1.0% said biopolymer.

13. The composition of claim 1 comprising about 3.0% said biopolymer.

14. The composition of claim 1 comprising at least 0.5% said biopolymer.

15. The composition of claim 1 comprising about 0.5% said biopolymer.

16. The composition of claim 1 wherein said biopolymer is at least one biopolymer selected from a group of biopolymers consisting of rhamsan, xanthan and welan biopolymers.

17. The composition of claim 1 wherein said biopolymer is at least one xanthan biopolymer.

18. The composition of claim 1 comprising no hydroxypropyl guar gum.

19. A fire retardant composition comprising:
   at least one fire retardant comprised of at least one ammonium polyphosphate;
   in the range of about 0.01% to about 5.0% at least one xanthan biopolymer having a weight average particle diameter less than about 100 microns; and
   at least one additive selected from a group of additives consisting of coloring agents, surfactants, stabilizers, corrosion inhibitors, opacifying pigments and any combination thereof.

20. A fire retardant composition comprising:
   at least one fire retardant comprised of at least one ammonium polyphosphate;
   water;
   in the range of about 0.00224% to about 1.12% of at least one xanthan biopolymer having a weight average particle diameter less than about 100 microns; and
   at least one additive selected from a group of additives consisting of coloring agents, surfactants, stabilizers, corrosion inhibitors, opacifying pigments and any combination thereof.

* * * * *